US012775837B2

(12) United States Patent
Hawkins et al.

(10) Patent No.: US 12,775,837 B2
(45) Date of Patent: Oct. 27, 2026

(54) METHODS AND SYSTEMS FOR IMPROVED DEEP-LEARNING MODELS

(71) Applicant: REGENERON PHARMACEUTICALS, INC., Tarrytown, NY (US)

(72) Inventors: Peter Hawkins, Tarrytown, NY (US); Wen Zhang, Tarrytown, NY (US); Gurinder Atwal, Tarrytown, NY (US)

(73) Assignee: Regeneron Pharmaceuticals, Inc., Tarrytown, NY (US)

(*) Notice: Subject to any disclaimer, the term of this patent is extended or adjusted under 35 U.S.C. 154(b) by 1057 days.

(21) Appl. No.: 17/570,789

(22) Filed: Jan. 7, 2022

(65) Prior Publication Data

US 2022/0222526 A1 Jul. 14, 2022

Related U.S. Application Data

(60) Provisional application No. 63/135,265, filed on Jan. 8, 2021.

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC ................................. G06N 3/08; G06N 3/045
See application file for complete search history.

(56) References Cited

U.S. PATENT DOCUMENTS

| | | | | |
|---|---|---|---|---|
| 6,230,151 | B1 * | 5/2001 | Agrawal | G06N 5/01 706/12 |
| 11,460,982 | B1 * | 10/2022 | Knight | G06F 3/0484 |
| 2019/0205791 | A1 | 7/2019 | Litherland et al. | |
| 2020/0311467 | A1 | 10/2020 | Srivastava et al. | |
| 2021/0365532 | A1 * | 11/2021 | Engelsma | G06N 3/08 |
| 2022/0156555 | A1 * | 5/2022 | Burba | G06N 3/049 |
| 2022/0386939 | A1 * | 12/2022 | Chan | G01N 21/65 |
| 2025/0036947 | A1 * | 1/2025 | Zhang | G06N 3/08 |

FOREIGN PATENT DOCUMENTS

| | | | |
|---|---|---|---|
| CN | 109325541 | A | 2/2019 |
| JP | 2020149680 | A | 9/2020 |
| WO | 2020185256 | A1 | 9/2020 |

OTHER PUBLICATIONS

Japanese Office Action with translation in Japanese App. No. 2023-541787 mailed Aug. 6, 2024, 9 pages.

(Continued)

*Primary Examiner* — Andrew J Jung
(74) *Attorney, Agent, or Firm* — Smith Baluch LLP

(57) ABSTRACT

Described herein are methods and systems for generating, training, and tailoring deep-learning models. The present methods and systems may provide a generalized framework for using deep-learning models to analyze data records comprising one or more strings (e.g., sequences) of data. Unlike existing deep-learning models and frameworks, which are designed to be problem/analysis specific, the generalized framework described herein may be applicable for a wide range of predictive and/or generative data analysis.

20 Claims, 10 Drawing Sheets

(56) References Cited

OTHER PUBLICATIONS

Australian Notice of Allowance in Australian App. No. 2022206271 dated Nov. 1, 2024, 3 pages.
International Search Report and Written Opinion mailed on Jul. 26, 2021 by the International Searching Authority for PCT Application No. PCT/US2021/028500, filed on Apr. 21, 2021 (12 Pages).
Jurtz Vanessa Isabell et al, "NetTCR: sequence-based prediction of TCR binding to peptide-MHC complexes using convolutional neural networks", pp. 3-11 (2018).
Sidhom John-William et al, "DeepTOR: a deep learning framework for understanding T-cell receptor sequence signatures within complex T-cell repertoires" (2019).
Zhang Wen C et al, "A framework for highly multiplexed dextramer mapping and prediction of T cell receptor sequences to antigen specificity", pp. 5835-14 (2021).
International Search Report and Written Opinion mailed on May 3, 2022, for PCT/US22/11562, filed on Jan. 7, 2022 (18 pages).
Australian Office Action No. 2 in Australian App. No. 2022206271 dated Sep. 24, 2024, 4 pages.
Office Action in New Zealand Appl No.801613 dated Feb. 12, 2025, 4 pages.
Australian Office Action in Australian App. No. 2022206271 dated Dec. 11, 2023, 4 pages.
Japanese Office Action (NOA) with translation in Japanese App. No. 2023-541787 mailed Dec. 24, 2024, 6 pages.
First Office Action with translation and search report in Chinese App. No. 2022800093441 dated Aug. 29, 2025, 17 pages.
Office Action in New Zealand Appl No.801613 dated Sep. 4, 2025, 8 pages.
Israel Office Action in Israeli App. No. 304114 dated Oct. 29, 2025, 4 pages.
Boschetti, et al., Introduction to Data Science: the Python Language, Feb. 29, 2020, translated by Yu Junwei, pp. 112-116, 9 pages.
Office Action (Patent Exam Report #3) in New Zealand Appl No. 801613 dated Dec. 18, 2025, 9 pages.
Office Action in New Zealand Appl. No. 801613 dated Feb. 4, 2026, 4 pages.
Second Office Action with translation and search report in Chinese App. No. 2022800093441 dated Jan. 28, 2026, 35 pages.
Guo, et al. "Entity embeddings of categorical variables." arXiv preprint arXiv:1604.06737 (2016), 9 pages.
Huang et al., DeepPurpose: a Deep Learning Library for Drug-Target Interaction Prediction, arXiv:2004.08919v.3, 2020, 9 pages.
Korean Office action with machine translation in Korean App. No. 10-2023-7025905 dated Jul. 16, 2026, 13 pages.

* cited by examiner

METHODS AND SYSTEMS FOR IMPROVED DEEP-LEARNING MODELS

CROSS-REFERENCE TO RELATED PATENT APPLICATION

This application claims priority to U.S. Provisional Application No. 63/135,265, filed on Jan. 8, 2021, the entirety of which is incorporated by reference herein.

BACKGROUND

Most deep-learning models, such as artificial neural networks, deep neural networks, deep belief networks, recurrent neural networks, and convolutional neural networks, are designed to be problem/analysis specific. As a result, most deep-learning models are not generally applicable. Thus, there is a need for a framework for generating, training, and tailoring deep-learning models that may be applicable for a range of predictive and/or generative data analysis. These and other considerations are described herein.

SUMMARY

It is to be understood that both the following general description and the following detailed description are exemplary and explanatory only and are not restrictive. Described herein are methods and systems for improved deep-learning models. In one example, a plurality of data records and a plurality of variables may be used by a computing device to generate and train a deep-learning model, such as a predictive model. The computing device may determine a numeric representation for each data record of a first subset of the plurality of data records. Each data record of the first subset of the plurality of data records may comprise a label, such as a binary label (e.g., yes/no) and/or a percentage value. The computing device may determine a numeric representation for each variable of a first subset of the plurality of variables. Each variable of the first subset of the plurality of variables may comprise the label (e.g., the binary label and/or the percentage value). A first plurality of encoder modules may generate a vector for each attribute of each data record of the first subset of the plurality of data records. A second plurality of encoder modules may generate a vector for each attribute of each variable of the first subset of the plurality of variables.

The computing device may determine a plurality of features for the predictive model. The computing device may generate a concatenated vector. The computing device may train the predictive model. The computing device may train the first plurality of encoder modules and/or the second plurality of encoder modules. The computing device may output the predictive model, the first plurality of encoder modules, and/or the second plurality of encoder modules following the training. The predictive model, the first plurality of encoder modules, and/or the second plurality of encoder modules—once trained—may be capable of providing a range of predictive and/or generative data analysis.

As an example, the computing device may receive a previously unseen data record (a "first data record") and a previously unseen plurality of variables (a "first plurality of variables). The computing device may determine a numeric representation for the first data record. The computing device may determine a numeric representation for each variable of the first plurality of variables. The computing device may use a first plurality of trained encoder modules to determine a vector for the first data record. The computing device may use the first plurality of trained encoder modules to determine the vector for the first data record based on the numeric representation for the data record.

The computing device may use a second plurality of trained encoder modules to determine a vector for each attribute of each variable of the first plurality of variables. The computing device may use the second plurality of trained encoder modules to determine the vector for each attribute of each variable of the first plurality of variables based on the numeric representation for each variable of the plurality of variables. The computing device may generate a concatenated vector based on the vector for the first data record and the vector for each attribute of each variable of the first plurality of variables. The computing device may use a trained predictive model to determine one or more of a prediction or a score associated with the first data record. The trained predictive model may determine one or more of the prediction or the score associated with the first data record based on the concatenated vector.

Trained predictive models and trained encoder modules as described herein may be capable of providing a range of predictive and/or generative data analysis. The trained predictive models and the trained encoder modules may have been initially trained to provide a first set of predictive and/or generative data analysis, and each may be retrained in order to provide another set of predictive and/or generative data analysis. Once retrained, predictive models and encoder modules described herein may provide another set of predictive and/or generative data analysis. Additional advantages of the disclosed methods and systems will be set forth in part in the description which follows, and in part will be understood from the description, or may be learned by practice of the disclosed method and systems.

BRIEF DESCRIPTION OF THE DRAWINGS

The accompanying drawings, which are incorporated in and constitute a part of the present description, serve to explain the principles of the methods and systems described herein.

DETAILED DESCRIPTION

Figure 1:
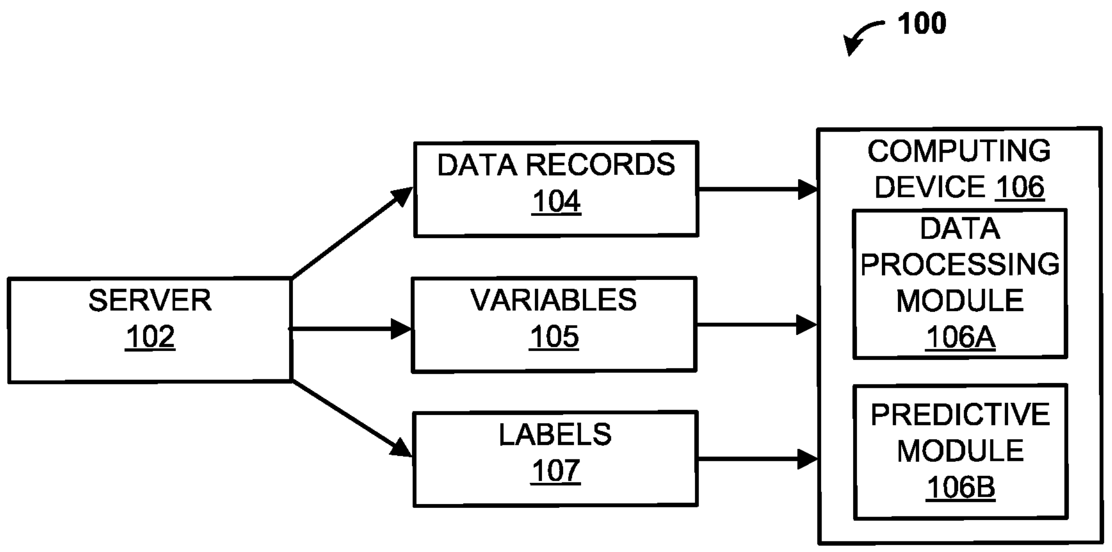
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

“Optional” or “optionally” means that the subsequently described event or circumstance may or may not occur, and that the description includes cases where said event or circumstance occurs and cases where it does not.

Throughout the description and claims of this specification, the word “comprise” and variations of the word, such as “comprising” and “comprises,” means “including but not limited to,” and is not intended to exclude, for example, other components, integers or steps. “Exemplary” means “an example of” and is not intended to convey an indication of a preferred or ideal configuration. “Such as” is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Described herein are methods and systems for improved deep-learning models. As an example, the present methods and systems may provide a generalized framework for using deep-learning models to analyze data records comprising one or more strings (e.g., sequences) of data. This framework may generate, train, and tailor deep-learning models that may be applicable for a range of predictive and/or generative data analysis. The deep-learning models may receive a plurality of data records, and each data record may comprise one or more attributes (e.g., strings of data, sequences of data, etc.). The deep-learning models may use the plurality of data records and a corresponding plurality of variables to output one or more of: a binomial prediction, a multinomial prediction, a variational autoencoder, a combination thereof, and/or the like.

In one example, a plurality of data records and a plurality of variables may be used by a computing device to generate and train a deep-learning model, such as a predictive model. Each data record of the plurality of data records may comprise one or more attributes (e.g., strings of data, sequences of data, etc.). Each data record of the plurality of data records may be associated with one or more variables of the plurality of variables. The computing device may determine a plurality of features for a model architecture to train the predictive model. The computing device may determine the plurality of features, for example, based on a set of hyperparameters comprising a number of neural network layers/blocks, a number of neural network filters in a neural network layer, etc.

An element of the set of hyperparameters may comprise a first subset of the plurality of data records (e.g., data record attributes/variables) to include in the model architecture and for training the predictive model. Another element of the set of hyperparameters may comprise a first subset of the plurality of variables (e.g., attributes) to include in the model architecture and for training the predictive model. The computing device may determine a numeric representation for each data record of the first subset of the plurality of data records. Each numeric representation for each data record of the first subset of the plurality of data records may be generated based on the corresponding one or more attributes. Each data record of the first subset of the plurality of data records may be associated with a label, such as a binary label (e.g., yes/no) and/or a percentage value.

The computing device may determine a numeric representation for each variable of the first subset of the plurality of variables. Each variable of the first subset of the plurality of variables may be associated with the label (e.g., the binary label and/or the percentage value). A first plurality of encoder modules may generate a vector for each attribute of each data record of the first subset of the plurality of data records. For example, the first plurality of encoder modules may generate the vector for each attribute of each data record of the first subset of the plurality of data records based on the numeric representation for each data record of the first subset of the plurality of data records. A second plurality of encoder modules may generate a vector for each attribute of each variable of the first subset of the plurality of variables. For example, the second plurality of encoder modules may generate the vector for each attribute of each variable of the first subset of the plurality of variable based on the numeric representation for each variable of the first subset of the plurality of variables.

The computing device may generate a concatenated vector. For example, the computing device may generate the concatenated vector based on the vector for each attribute of each data record of the first subset of the plurality of data records. As another example, the computing device may generate the concatenated vector based on the vector for each attribute of each variable of the first subset of the plurality of variables. As discussed above, the plurality of features may comprise as few as one or as many as all corresponding attributes of the data records of the first subset of the plurality of data records and the variables of the first subset of the plurality of variables. The concatenated vector may therefore be based on as few as one or as many as all corresponding attributes of the data records of the first subset of the plurality of data records and the variables of the first subset of the plurality of variables. The concatenated vector may be indicative of the label. For example, the concatenated vector may be indicative of the label for each attribute of each data record of the first subset of the plurality of data records (e.g., the binary label and/or the percentage value). As another example, the concatenated vector may be indicative of the label for each variable of the first subset of the plurality of variables (e.g., the binary label and/or the percentage value).

The computing device may train the predictive model. For example, the computing device may train the predictive model based on the concatenated vector or a portion thereof (e.g., based on particular data record attributes and/or variable attributes chosen). The computing device may train the first plurality of encoder modules and/or the second plurality of encoder modules. For example, the computing device may train the first plurality of encoder modules and/or the second plurality of encoder modules based on the concatenated vector.

The computing device may output (e.g., save) the predictive model, the first plurality of encoder modules, and/or the second plurality of encoder modules following the training. The predictive model, the first plurality of encoder modules, and/or the second plurality of encoder modules—once trained—may be capable of providing a range of predictive and/or generative data analysis, such as providing a binomial prediction, a multinomial prediction, a variational autoencoder, a combination thereof, and/or the like.

As an example, the computing device may receive a previously unseen data record (a "first data record") and a previously unseen plurality of variables (a "first plurality of variables). The first plurality of variables may be associated with the first data record. The computing device may determine a numeric representation for the first data record. For example, the computing device may determine the numeric representation for the first data record in a similar manner as described above regarding the first subset of the plurality of data records (e.g., the training data records). The computing device may determine a numeric representation for each variable of the first plurality of variables. For example, the computing device may determine the numeric representation for each of the first plurality of variables in a similar manner as described above regarding the first subset of the plurality of variables (e.g., the training variables). The computing device may use a first plurality of trained encoder modules to determine a vector for the first data record. For example, the computing device may use the first plurality of encoder modules described above that were trained with the predictive model when determining the vector for the first data record. The computing device may use the first plurality of trained encoder modules to determine the vector for the first data record based on the numeric representation for the data record.

The computing device may use a second plurality of trained encoder modules to determine a vector for each attribute of each variable of the first plurality of variables. For example, the computing device may use the first plurality of encoder modules described above that were trained with the predictive model when determining the vector for each attribute of each variable of the first plurality of variables. The computing device may use the second plurality of trained encoder modules to determine the vector for each attribute of each variable of the first plurality of variables based on the numeric representation for each variable of the plurality of variables.

The computing device may generate a concatenated vector based on the vector for the first data record and the vector for each attribute of each variable of the first plurality of variables. The computing device may use a trained predictive model to determine one or more of a prediction or a score associated with the first data record. The trained predictive model may comprise the predictive model described above that was trained along with the first plurality of encoder modules and the second plurality of encoder modules. The trained predictive model may determine one or more of the prediction or the score associated with the first data record based on the concatenated vector. The score may be indicative of a likelihood that a first label applies to the first data record. For example, the first label may comprise a binary label (e.g., yes/no) and/or a percentage value.

Trained predictive models and trained encoder modules as described herein may be capable of providing a range of predictive and/or generative data analysis. The trained predictive models and the trained encoder modules may be have been initially trained to provide a first set of predictive and/or generative data analysis, and each may be retrained in order to provide another set of predictive and/or generative data analysis. For example, the first plurality of trained encoder modules described herein may have been initially trained based on a plurality of training data records associated with a first label and a first set of hyperparameters. The first plurality of trained encoder modules may be retrained based on a further plurality of data records associated with a second set of hyperparameters that differ at least partially from the first set of hyperparameters. For example, the second set of hyperparameters and the first set of hyperparameters may comprise a similar data type (e.g., string, integer, etc.). As another example, the second plurality of trained encoder modules described herein may have been initially trained based on a plurality of training variables associated with the first label and the first set of hyperparameters. The second plurality of trained encoder modules may be retrained based on a further plurality of variables associated with the second set of hyperparameters.

As a further example, the trained predictive model described herein may have been initially trained based on a first concatenated vector. The first concatenated vector may have been derived/determined/generated based on the plurality of training data records (e.g., based on the first label and the first set of hyperparameters) and/or based on the plurality of training variables (e.g., based on the first label and the second set of hyperparameters). The trained predictive model may be retrained based on a second concatenated vector. The second concatenated vector may be derived/determined/generated based on a vector for each attribute of each data record of the further plurality of data records. The second concatenated vector may also be derived/determined/generated based on a vector for each attribute of each variable of the further plurality of variables and an associated set of hyperparameters. The second concatenated vector may also be derived/determined/generated based on the further plurality of data records associated with the second set of hyperparameters and/or a further set of hyperparameters. In this way, the first plurality of encoder modules and/or the second plurality of encoder modules may be retrained based on the second concatenated vector. Once retrained, predictive models and encoder modules described herein may provide another set of predictive and/or generative data analysis.

Turning now to FIG. 1, a system 100 is shown. The system 100 may generate, train, and tailor deep-learning models. The system 100 may comprise a computing device 106. The computing device 106 may be, for example, a smartphone, a tablet, a laptop computer, a desktop computer, a server computer, or the like. The computing device 106 may comprise a group of one or more servers. The computing device 106 may be configured to generate, store, maintain, and/or update various data structures, including a database(s), for storage of data records 104, variables 105, and labels 107.

The data records 104 may comprise one or more strings (e.g., sequences) of data and one or more attributes associated with each data record. The variables 105 may comprise a plurality of attributes, parameters, etc., that are associated with the data records 104. The labels 107 may each be associated with one or more of the data records 104 or the variables 105. The labels 107 may comprise a plurality of binary labels, a plurality of percentage values, etc. In some examples, the labels 107 may comprise one or more attributes of the data records 104 or the variables 105. The computing device 106 may be configured to generate, store, maintain, and/or update various data structures, including a database(s), stored at a server 102. The computing device 106 may comprise a data processing module 106A and a predictive module 106B. The data processing module 106A and the predictive module 106B may be stored and/or configured to operate on the computing device 106 or separately on separate computing devices.

The computing device 106 may implement a generalized framework for using deep-learning models, such as predictive models, to analyze the data records 104, the variables 105, and/or the labels 107. The computing device 106 may receive data records 104, the variables 105, and/or the labels 107 from the server 102. Unlike existing deep-learning models and frameworks, which are designed to be problem/analysis specific, the framework implemented by the computing device 106 may be applicable for a wide range of predictive and/or generative data analysis. For example, the framework implemented by the computing device 106 may generate, train, and tailor predictive models that may be applicable for a range of predictive and/or generative data analysis. The predictive models may output one or more of: a binomial prediction, a multinomial prediction, a variational autoencoder, a combination thereof, and/or the like. The data processing module 106A and the predictive module 106B be highly modularized and allow for adjustment to model architecture. The data records 104 may comprise any type of data record, such as strings (e.g., sequences) of alphanumeric characters, words, phrases, symbols, etc. The data records 104, the variables 105, and/or the labels 107 may be received as data records within a spreadsheet, such as one or more of a CSV file, a VCF file, a FASTA file, a FASTQ file, or any other suitable data storage format/file as are known to those skilled in the art.

As further described herein, the data processing module 106A may process the data records 104 and the variables 105 into numerical form in a non-learnable way, via one or more "processors" that convert the data records 104 and the variables 105 (e.g., strings/sequences of alphanumeric characters, words, phrases, symbols, etc.) into numerical representations. These numerical representations, as further described herein, may be further processed in learnable ways via one or more "encoder modules." An encoder module may comprise a block of a neural network that is utilized by the computing device 106. An encoder module may output a vector representation of any of the data records 104 and/or any of the variables 105. A vector representation of a given data record and/or a given variable may be based on a corresponding numerical representation of the given data record and/or the given variable. Such vector representations may be referred to herein as "fingerprints." A fingerprint of a data record may be based on attributes associated with the data record. The fingerprint of the data record may be concatenated with a fingerprint of a corresponding variable(s) and other corresponding data records into a single concatenated fingerprint. Such concatenated fingerprints may be referred to herein as concatenated vectors. Concatenated vectors may describe a data record (e.g., attributes associated with the data record) and its corresponding variable(s) as single numerical vector.

As an example, a first data record of the data records 104 may be processed into a numerical format by a processor as described herein. The first data record may comprise strings (e.g., sequences) of alphanumeric characters, words, phrases, symbols, etc., for which each element of the sequence may be converted into a numeric form. A dictionary mapping between sequence elements and their respective numerical form may be generated based on a data type and/or attribute types associated with the data records 104. The dictionary mapping between sequence elements and their respective numerical form may also be generated based on a portion of the data records 104 and/or the variables 105 that are used for training. The dictionary may be used to convert the first data record into the integer form and/or into the one-hot representation of the integer form. The data processing module 106A may comprise a trainable encoder model that may be used to extract features from the numerical representation of the first data record. Such extracted features may comprise a 1*d* numerical vector, or a "fingerprint" as described herein. A first variable of the variables 106 may be processed into a numerical format by a processor as described herein. The first variable may comprise strings of alphanumeric characters, words, phrases, symbols, etc., which may be converted into a numeric form. A dictionary mapping between variable input values and their respective numeric form may be generated based on a data type and/or attribute types associated with the variables 106. The dictionary may be used to convert the first variable into the integer form and/or into the one-hot representation of the integer form. The data processing module 106A and/or the predictive module 106B may comprise a trainable encoder layer to extract features (e.g., a 1*d* vector/fingerprint) from the numerical representation of the first variable. The fingerprint of the first data record and the fingerprint of the first variable may be concatenated together into a single concatenated fingerprint/vector.

Concatenated vectors may be passed to a predictive model generated by the predictive module 106B. The predictive model may be trained as described herein. The predictive model may process concatenated vectors and provide an output comprising one or more of a prediction, a score, etc. The predictive model may comprise one or more final blocks of a neural network, as described herein. The predictive model and/or the encoders described herein may be trained—or retrained as the case may be—to perform binomial, multinomial, regression, and/or other tasks. As an example, the predictive model and/or the encoders described herein may be used by the computing device 106 to provide a prediction of whether attributes of a particular data record(s) and/or variable(s) (e.g., features) are indicative of a particular result (e.g., a binary prediction, a confidence score, a prediction score, etc.).

Figure 2:
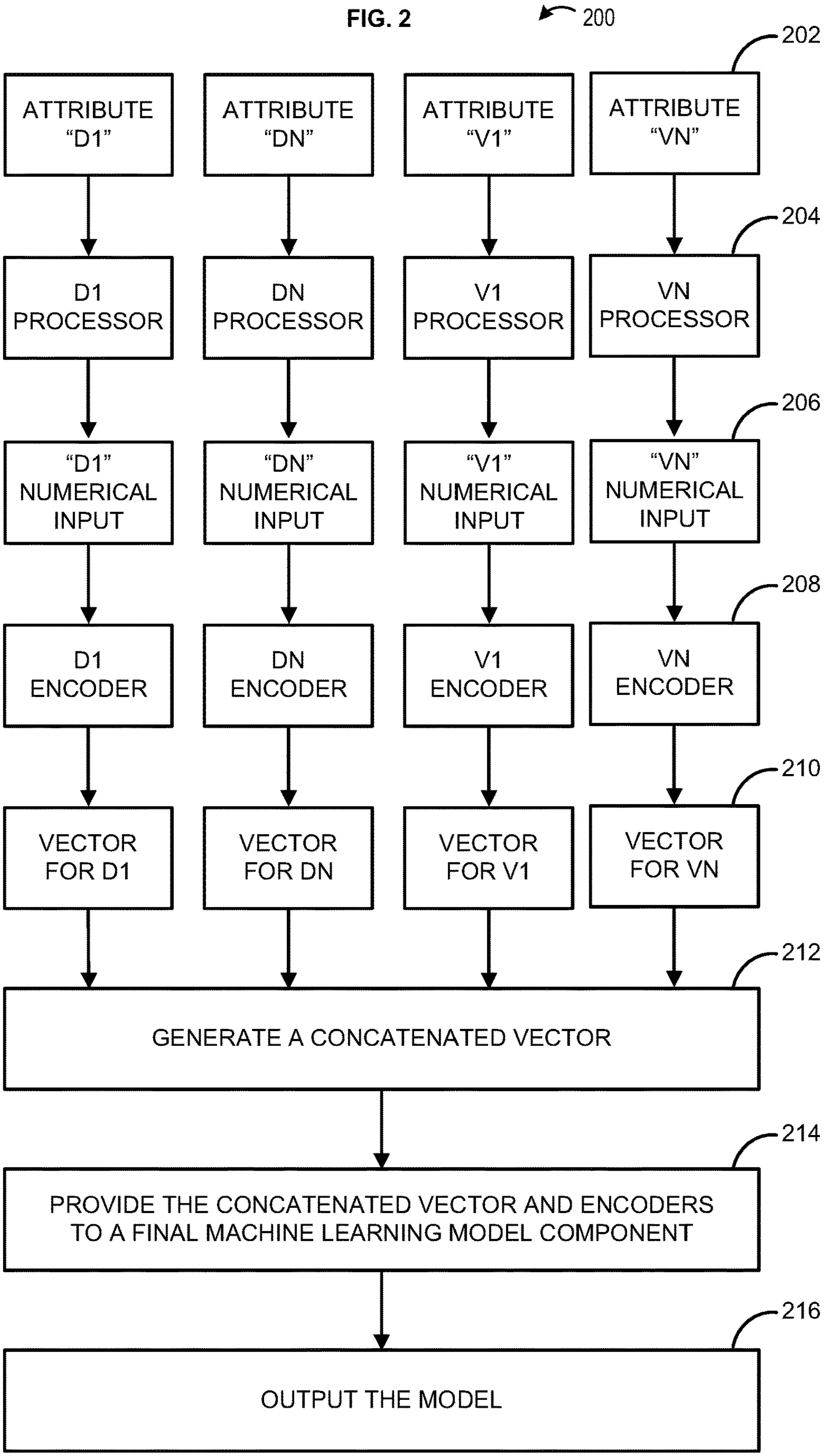
FIG. 2 shows an example method.

FIG. 2 shows a flowchart of an example method 200. The method 200 may be performed by the data processing module 106A and/or the predictive module 106B using a neural network architecture. 2 Some steps of the method 200 may be performed by the data processing module 106A, and other steps may be performed by the predictive module 106B.

The neural network architecture used in the method 200 may comprise a neural network architecture. For example, the neural network architecture used in the method 200 may comprise a plurality of neural network blocks and/or layers that may be used to generate vectors/fingerprints of each of the data records 104 and the variables 105 (e.g., based on the attributes thereof). As described herein, each attribute of each data record of the data records 104 may be associated with a corresponding neural network block, and each attribute of each variable of the variables 105 may be associated with a corresponding neural network block. A subset of the data records 104 and/or a subset of the attributes of each of the data records 104 may be used rather than each and every data record and/or attribute of the data records 104. If a subset of the data records 104 contains one or more attribute types that do not have a corresponding neural network block, then the data records associated with those one or more attribute types may be disregarded by the method 200. In this way, a given predictive model generated by the computing device 106 may receive all of the data records 104 but only a subset of the data records 104 that have corresponding neural network blocks may be used by the method 200. As another example, even if all of the data records 104 contain attribute types that each have a corresponding neural network block, a subset of the data records 104 may nevertheless not be used by the method 200. Determining which data records, attribute types, and/or corresponding neural network blocks that are used by the method 200 may be based on, for example, a chosen set of hyperparameters, as further described herein, and/or based on a keyed dictionary/mapping between attribute types and corresponding neural network blocks.

The method 200 may employ a plurality of processors and/or a plurality of tokenizers. The plurality of processors may convert attribute values, such as strings (e.g., sequences) of alphanumeric characters, words, phrases, symbols, etc., within each of the data records 104 into corresponding numerical representations. The plurality of tokenizers may convert attribute values, such as strings (e.g., sequences) of alphanumeric characters, words, phrases, symbols, etc., within each of the variables 105 into corresponding numerical representations. For ease of explanation, a tokenizer may be referred to herein as a "processor." In some examples, the plurality of processors may not be used by the method 200. For example, the plurality of processors may not be used for any of the data records 104 or the variables 105 that are in numerical form.

As described herein, the plurality of data records 104 may each comprise any type of attribute, such as strings (e.g., sequences) of alphanumeric characters, words, phrases, symbols, etc. For purposes of explanation, the method 200 is described herein and shown in FIG. 2 as processing two attributes for a data record: attribute "D1" and attribute "DN"—and two variable attributes: attribute "V1" and attribute "VN." However, it is to be understood that the method 200 may process any number of data record attributes and/or variable attributes. At step 202, the data processing module 106A may receive the attributes D1 and DN and the variable attributes V1 and VN. Each of the attributes D1 and DN may be associated with a label, such as a binary label (e.g., yes/no) and/or a percentage value (e.g., a label of the labels 107). Each of the variable attributes V1 and VN may be associated with the label (e.g., the binary label and/or the percentage value). The data processing module 106A may determine a numeric representation for each of the attributes D1 and DN and each of the variable attributes V1 and VN. The method 200 may employ a plurality of processors and/or a plurality of tokenizers. The plurality of processors may convert attributes of the data records 104 (e.g., strings/sequences of alphanumeric characters, words, phrases, symbols, etc.) into corresponding numerical representations. The plurality of tokenizers may convert attributes of the variables 105 (e.g., strings/sequences of alphanumeric characters, words, phrases, symbols, etc.) into corresponding numerical representations. For ease of explanation, a tokenizer may be referred to herein as a "processor." While the method 200 is described herein and shown in FIG. 2 as having four processors: a "D1 processor" for the attribute D1; a "DN processor" for the attribute DN; a "V1 processor" for the variable attribute V1; and a "VN processor" for the variable attribute VN, it is to be understood that the data processing module 106A may comprise—and the method 200 may use—any number of processors/tokenizers.

Each of the processors shown in FIG. 2 may utilize a plurality of algorithms, such as transformation methods, at step 204 to convert each of the attributes D1 and DN and each of the variable attributes V1 and VN into corresponding numerical representations that can be processed by corresponding neural network blocks. A corresponding numerical representation may comprise a one-dimensional integer representation, a multi-dimensional array representation, a combination thereof, and/or the like. Each of the attributes D1 and DN may be associated with a corresponding neural network block based on corresponding data type(s) and/or attribute values. As another example, each of the variable attributes V1 and VN may be associated with a corresponding neural network block based on corresponding data type(s) and/or attribute values.

Figure 3A:
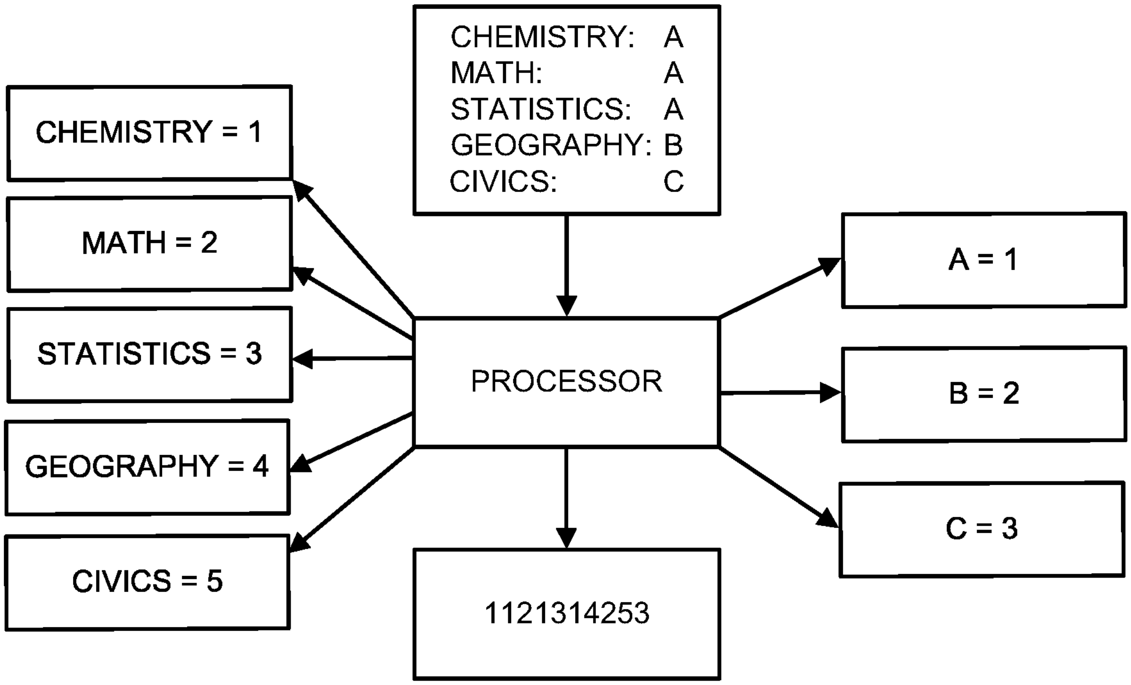
FIGS. 3A and 3B show components of an example system.

FIG. 3A shows an example processor for the attribute D1 and/or the attribute DN. As an example, the data records 104 processed according to the method 200 may comprise grade records for a plurality of students, and each of the data records 104 may comprise a plurality of attributes having a "string" data type for class names and corresponding values having a "string" data type for grades achieved in each class. The processor shown in FIG. 3A may convert each of the attributes D1 and DN into corresponding numerical representations that can be processed by corresponding neural network blocks. As shown in FIG. 3A, the processor may assign a numerical value of "1" to the "Chemistry" class name for the attribute D1. That is, the processor may determine a numerical representation for the string value of "Chemistry" by using the integer value of "1." The processor may determine corresponding integer values for every other class name associated with the data record into corresponding numerical representations. For example, the string value of "Math" may be assigned an integer value of "2," the string value of "Statistics" may be assigned an integer value of "3," and so forth. As also shown in FIG. 3A, the processor may assign a numerical value of "1" to the letter grade (e.g., string value) "A." That is, the processor may determine a numerical representation for the string value of "A" by using the integer value of "1." The processor may determine corresponding integer values for every other letter grade associated with the data record into corresponding numerical representations. For example, the letter grade "B" may be assigned an integer value of "2," and the letter grade "C" may be assigned an integer value of "3."

Figure 3B:
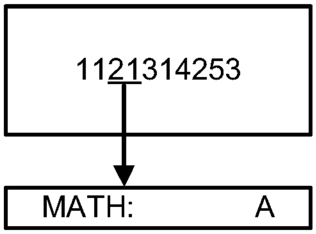

As shown in FIG. 3A, the numerical representation for the attribute D1 may comprise a one-dimensional integer representation of "1121314253." The processor may generate the numerical representation for the attribute D1 in an ordered manner, where the first position represents the first class listed in the attribute D1 (e.g., "Chemistry") and the second position represents the grade for the first class listed in the attribute D1 (e.g., "A"). Remaining positions may be ordered similarly. Additionally, the processor may generate the numerical representation for the attribute D1 in another ordered manner, as one skilled in the art may appreciate, such as a list of pairs (integer position, integer grade, such as "11123." As shown in FIG. 3B, the third position within "1121314253" (e.g., the integer value of "2") may correspond to the class name "Math," and the fourth position within "1121314253" (e.g., the integer value of "1") may correspond to the letter grade "A." The processors may convert the attribute DN in a similar manner as described herein with respect to the data record attribute D1. For example, the attribute DN may comprise a one-dimensional integer representation of grades for the student associated with the data record for another year (e.g., another class year).

Figure 4A:
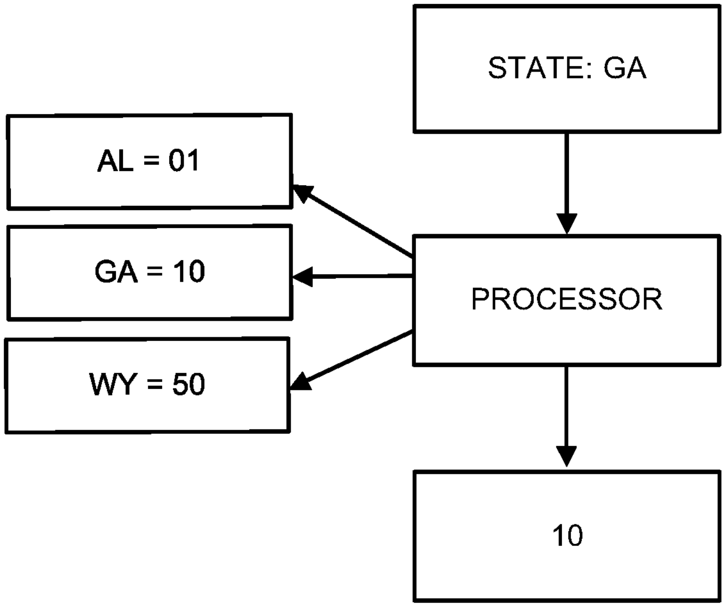
FIGS. 4A and 4B show components of an example system.
Figure 4B:
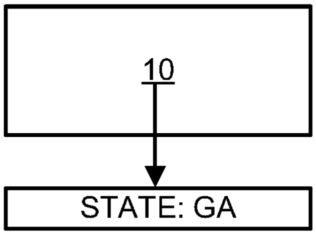

As another example, the variables 105 processed according to the method 200 may be associated with the plurality of students. The variables 105 may comprise one or more attributes. For example, and for purposes of explanation, the one or more attributes may comprise a plurality of demographic attributes having a "string" data type with corresponding values having a "string" and/or an "integer" data type. The plurality of demographic attributes may comprise, for example, age, state of residence, city of school, etc. Each FIG. 4A shows an example processor for a variable attribute, such as the variable attribute V1 or the variable attribute VN. The processor shown in FIG. 4A may convert the variable attribute, which may comprise a demographic attribute of "state," into a corresponding numerical representation that can be processed by corresponding neural network blocks. The processor may associate an integer value to each possible string value for the demographic attribute of "state." For example, as shown in FIG. 4A, the string value of "AL" (e.g., Alabama) may be associated with an integer value of "01"; the string value of "GA" (e.g., Georgia) may be associated with an integer value of "10"; and the string value of "WY" (e.g., Wyoming) may be associated with an integer value of "50." As shown in FIG. 4B, the processor may receive the variable attribute of "State: GA" and assign a numerical value of "10" (e.g., indicating the state of Georgia). Each of one or more attributes associated with the variables 105 may be processed in a similar manner by a processor corresponding to each particular attribute type (e.g., a processor for "city," a processor for "age," etc.).

As described herein, the data processing module 106A may comprise data record encoders as well as variable encoders. For purposes of explanation, the data processing module 106A and the method 200 are described herein and shown in FIG. 2 as having four encoders: a "D1 encoder" for the attribute D1; a "DN encoder" for the attribute DN; a "V1 encoder" for the variable attribute V1; and a "VN encoder" for the variable attribute VN. However, it is to be understood that the data processing module 106A may comprise—and the method 200 may utilize—any number of encoders. Each of the encoders shown in FIG. 2 may be an encoder module as described herein, which may comprise a block of a neural network that is utilized by the data processing module 106A and/or the predictive module 100. At step 206, each of the processors may output their corresponding numerical representations of the attributes associated with the data records 104 and the attributes associated with the variables 105. For example, the D1 processor may output the numerical representation for the attribute D1 (e.g., the "D1 numerical input" shown in FIG. 2); the DN processor may output the numerical representation for the attribute DN (e.g., the "DN numerical input" shown in FIG. 2); the V1 processor may output the numerical representation for the variable attribute V1 (e.g., the "V1 numerical input" shown in FIG. 2); and the VN processor may output the numerical representation for the variable attribute VN (e.g., the "VN numerical input" shown in FIG. 2).

At step 208, the D1 encoder may receive the numerical representation of the attribute D1, and the DN encoder may receive the numerical representation of the attribute DN. The D1 encoder and the DN encoder shown in FIG. 2 may be configured to encode attributes having a particular data type (e.g., based on a datatype of the attribute D1 and/or the attribute DN). Also at step 208, the V1 encoder may receive the numerical representation of the variable attribute V1, and the VN encoder may receive the numerical representation of the variable attribute VN. The V1 encoder and the VN encoder shown in FIG. 2 may be configured to encode variable attributes having a particular data type (e.g., based on a datatype of the variable attribute V1 and/or the variable attribute VN).

At step 210, the D1 encoder may generate a vector for the attribute D1 based on the numerical representation of the attribute D1, and the DN encoder may generate a vector for the attribute DN based on the numerical representation of the attribute DN. Also at step 210, the V1 encoder may generate a vector for the variable attribute V1 based on the numerical representation of the variable attribute V1, and the VN encoder may generate a vector for the variable attribute VN based on the numerical representation of the variable attribute VN. The data processing module 106A may determine a plurality of features for a predictive model. The plurality of features may comprise one more attributes of one or more of the data records 104 (e.g., D1 and DN). As another example, the plurality of features may comprise one or more attributes of one or more of the variables 105 (e.g., V1 and VN).

At step 212, the data processing module 106A may generate a concatenated vector. For example, the data processing module 106A may generate the concatenated vector based on the plurality of features for the predictive model described above (e.g., based on the vector for the attribute D1; the vector for the attribute DN; the vector for the variable attribute V1; and/or the vector for the variable attribute VN). The concatenated vector may be indicative of the label described above for each of D1, DN, V1, and VN (e.g., the binary label and/or the percentage value).

At step 214, the data processing module 106A may provide the concatenated vector and/or the encoders D1, DN, V1, and VN to a final machine learning model component of the predictive module 106B. The final machine learning model component of the predictive module 106B may comprise a final neural network block and/or layer of the neural network architecture used in the method 200. The predictive module 106B may train the final machine learning model component and the encoders D1, DN, V1, and VN. For example, the predictive module 106B may train the final machine learning model component based on the concatenated vector generated at step 212. The predictive module 106B may also train each of the encoders shown in FIG. 2 based on the concatenated vector generated at step 212. For example, the data record may comprise a data type(s) (e.g., a string) and each of the attributes D1 and DN may comprise a corresponding attribute data type (e.g., strings for classes/letter grades). The D1 encoder and the DN encoder may be trained based on the data type(s) and the corresponding attribute data type. The D1 encoder and the DN encoder—once trained—may be capable of converting new/unseen data record attributes (e.g., grade records) into corresponding numerical forms and/or corresponding vector representations (e.g., fingerprints). As another example, each of the variable attributes V1 and VN may comprise a data type(s) (e.g., a string). The V1 encoder and the VN encoder may be trained based on the data type(s). The V1 encoder and the VN encoder—once trained—may be capable of converting new/unseen variable attributes (e.g., demographic attributes) into corresponding numerical forms and/or corresponding vector representations (e.g., fingerprints).

At step 216, the predictive module 106B may output (e.g., save) the machine learning model (e.g., the neural network architecture) used in the method 200), referred to herein as a "predictive model". Also at step 216, the predictive module 106B may output (e.g., save) the trained encoders D1, DN, V1, and VN. The predictive model and/or the trained encoders may be capable of providing a range of predictive and/or generative data analysis, such as providing a binomial prediction, a multinomial prediction, a variational autoencoder, a combination thereof, and/or the like. The predictive model trained by the predictive module 106B may produce an output, such as a prediction, a score, a combination thereof, and/or the like. The output of the predictive model may comprise a datatype that corresponds to the label associated with D1, DN, V1, and VN (e.g., a binary label and/or the percentage value). When training the predictive model, the predictive module 106B may minimize a loss function as further described herein. The output may comprise, for example, a number of dimensions corresponding to a number of dimensions associated with the label used during training. As another example, the output may comprise a keyed dictionary of outputs. When training the predictive model, a loss function may be used, and a minimization routine may be used to adjust one or more parameters of the predictive model in order to minimize the loss function. Additionally, when training the predictive model, a fit method may be used. The fit method may receive a dictionary with keys that correspond to the data type(s) associated with D1, DN, V1, and/or VN. The fit method may also receive the label associated with D1, DN, V1, and VN (e.g., a binary label and/or the percentage value).

The predictive model trained according to the method 200 may provide one or more of a prediction or a score associated with a data record and/or an associated attribute. As an example, the computing device 106 may receive a previously unseen data record (a "first data record") and a previously unseen plurality of variables (a "first plurality of variables). The data processing module 106A may determine a numeric representation for one or more attributes associated with the first data record. For example, the data processing module 106A may determine the numeric representation for the one or more attributes associated with the first data record in a similar manner as described above regarding the data record attributes D1 and DN that were used to train the predictive model. The data processing module 106A may determine a numeric representation for each variable attribute of the first plurality of variables. For example, the data processing module 106A may determine the numeric representation for each variable attribute in a similar manner as described above regarding the variable attributes V1 and VN that were used to train the predictive model. The data processing module 106A may use a first plurality of trained encoder modules to determine a vector for each of the one or more attributes associated with the first data record. For example, the data processing module 106A may use the trained encoders D1 and DN described above that were trained with the predictive model when determining the vectors for the data record attributes D1 and DN. The data processing module 106A may use the first plurality of trained encoder modules to determine the vectors for the one or more attributes associated with the first data record based on the numeric representation for the data record.

The data processing module 106A may use a second plurality of trained encoder modules to determine a vector for each variable attribute of the first plurality of variables. For example, the data processing module 106A may use the trained encoders V1 and VN described above that were trained with the predictive model when determining the vectors for each variable attribute of the first plurality of variables. The data processing module 106A may use the second plurality of trained encoder modules to determine the vectors for each variable attribute of the first plurality of variables based on the numeric representation for each variable attribute.

The data processing module 106A may generate a concatenated vector based on the vectors for the one or more attributes associated with the first data record and the vectors for each variable attribute of the first plurality of variables. The predictive module 106B may use the predictive model that was trained according to the method 200 described above to determine one or more of a prediction or a score associated with the first data record. The predictive module 106B may determine one or more of the prediction or the score associated with the first data record based on the concatenated vector. The score may be indicative of a likelihood that a first label applies to the first data record based on the one or more attributes associated with the first data record and the variable attributes. For example, the first label may be a binary label of the labels 107 comprising "Likely to Attend Ivy College" and "Not Likely to Attend an Ivy League College." The prediction may indicate a likelihood (e.g., a percentage) that a student associated with the first data record will attend an Ivy League college (e.g., a percentage indication that the first label "Likely to Attend Ivy College" applies).

As described herein, the predictive module 106B may determine one or more of the prediction or the score associated with the first data record based on the concatenated vector. The prediction and/or the score may be determined using one or more attributes associated with the first data record and one or more variables associated with the first data record (e.g., using all or less than all known data associated with the first data record). Continuing with the above example regarding grade records and demographic attributes, the prediction and/or the score may be determined using all grade records associated with a data record for a particular student (e.g., all class years) as well as all demographic attributes associated with that particular student. In other examples, the prediction and/or the score may be determined using less than all of the grade records and/or less than all of the demographic attributes. The predictive module 106B may determine a first prediction and/or a first score based on all of the attributes associated with the first data record and all of the variables associated with the first data record, and the predictive module 106B may determine a second prediction and/or a second score based on the portion of the attributes and/or variables associated with the first data record.

While the functionality of the present methods and systems are described herein using the example of grade records as being the data records 104 and demographic attributes as being the variables 105, it is to be understood that the data records 104 and the variables 105 are not limited to this example. The methods, systems, and deep-learning models described herein—such as the predictive model, the system 100, the method 200—may be configured to analyze any type of data record and any type of variable that may be expressed numerically (e.g., represented numerically). For example, the data records 104 and the variables 105 may comprise one or more strings (e.g., sequences) of data; one or more integers of data; one or more characters of data; a combination thereof and/or the like.

In addition to the grade records described herein, the data records 104 may comprise and/or relate to sales data, inventory data, genetic data, sports data, stock data, musical data, weather data, or any other data as one skilled in the art can appreciate that may be expressed numerically (e.g., represented numerically). Further, in addition to the demographic attributes described herein, the variables 105 may comprise and/or relate to product data, corporate data, biological data, statistical data, market data, instrument data, geological data, or any other data as one skilled in the art can appreciate that may be expressed numerically (e.g., represented numerically). Further, in addition to a binary label as described above regarding the grade records example (e.g., "Likely to Attend Ivy College" vs. "Not Likely to Attend an Ivy League College"), the label described herein may comprise a percentage value(s), one or more attributes associated with a corresponding data record and/or variable, one or more values for the one or more attributes, or any other label as one skilled in the art can appreciate.

As further described herein, during a training phase, attributes of one or more of the data records 104 and the variables 105 (e.g., values) may be processed by the deep-learning models described herein (e.g., the predictive model) to determine how each may correlate—individually, as well as in combination with other attributes—with a corresponding label. Following the training phase, the deep-learning models described herein (e.g., the trained predictive model) may receive a new/unseen data record(s) and associated variables and determine whether the label applies to the new/unseen data record(s) and associated variables.

Figure 5:
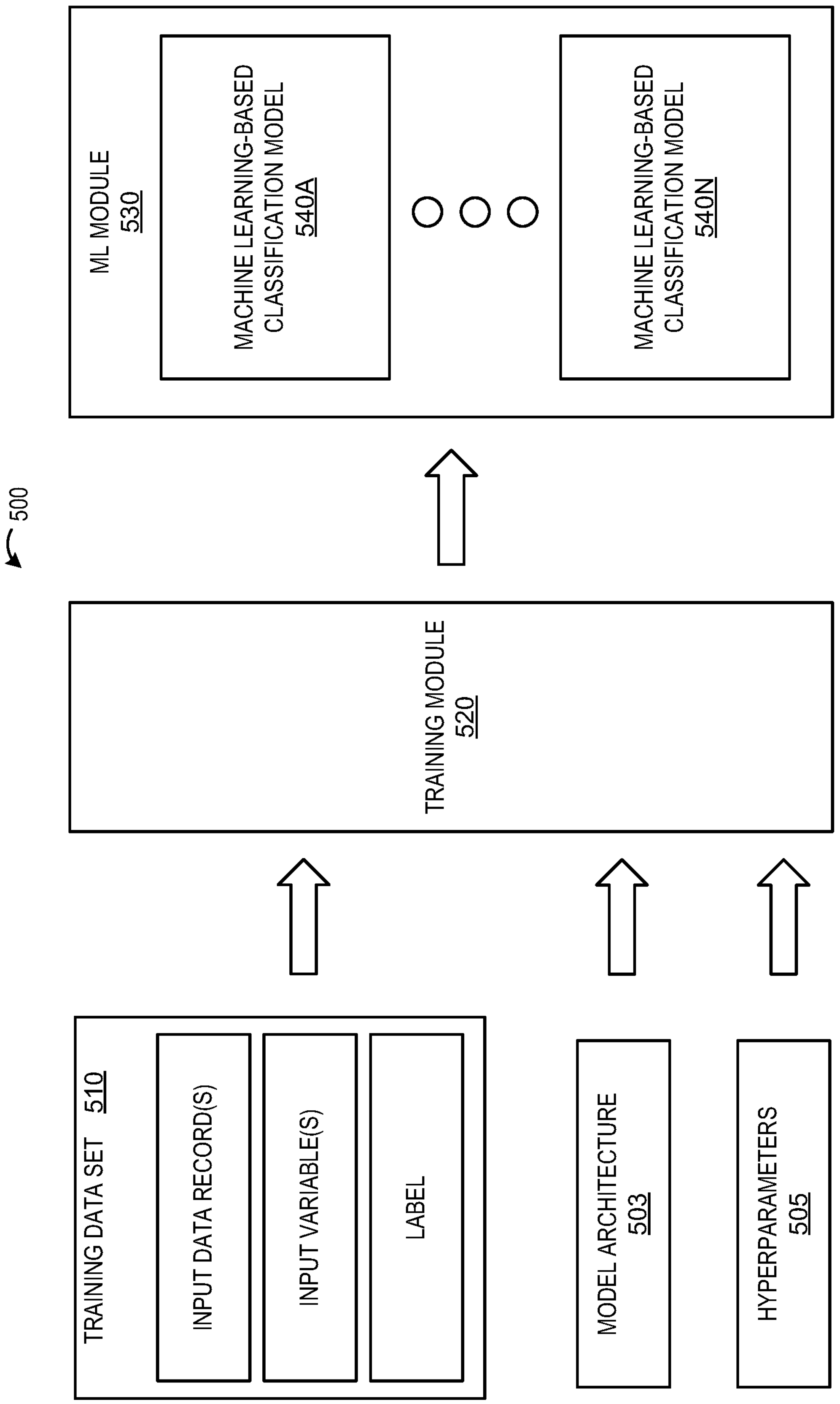
FIG. 5 shows an example system.

Turning now to FIG. 5, an example method 500 is shown. The method 500 may be performed by the predictive module 106B described herein. The predictive module 106B may be configured to use machine learning ("ML") techniques to train, based on an analysis of one or more training data sets 510 by a training module 520, at least one ML module 530 that is configured to provide one or more of a prediction or a score associated with data records and one or more corresponding variables. The predictive module 106B may be configured to train and configure the ML module 530 using one or more hyperparameters 505 and a model architecture 503. The model architecture 503 may comprise the predictive model output at step 216 of the method 200 (e.g., the neural network architecture used in the method 200). The hyperparameters 505 may comprise a number of neural network layers/blocks, a number of neural network filters in a neural network layer, etc. Each set of the hyperparameters 505 may be used to build the model architecture 503, and an element of each set of the hyperparameters 505 may comprise a number of inputs (e.g., data record attributes/variables) to include in the model architecture 503. For example, continuing with the above example regarding grade records and demographic attributes, an element of a first set of the hyperparameters 505 may comprise all grade records (e.g., data record attributes) associated with a data record for a particular student (e.g., all class years) and/or all demographic attributes (e.g., variable attributes) associated with that particular student. An element of a second set of the hyperparameters 505 may comprise grade records (e.g., data record attributes) for only one class year for a particular student and/or a demographic attribute (e.g., variable attribute) associated with that particular student. In other words, an element of each set of the hyperparameters 505 may indicate that as few as one or as many as all corresponding attributes of the data records and variables are to be used to build the model architecture 503 that is used to train the ML module 530.

The training data set 510 may comprise one or more input data records (e.g., the data records 104) and one or more input variables (e.g., the variable's 105) associated with one or more labels 107 (e.g., a binary label (yes/no) and/or a percentage value). The label for a given record and/or a given variable may be indicative of a likelihood that the label applies to the given record. One or more of the data records 104 and one or more of the variables 105 may be combined to result in the training data set 510. A subset of the data records 104 and/or the variables 105 may be randomly assigned to the training data set 510 or to a testing data set. In some implementations, the assignment of data to a training data set or a testing data set may not be completely random. In this case, one or more criteria may be used during the assignment. In general, any suitable method may be used to assign the data to the training or testing data sets, while ensuring that the distributions of yes and no labels are somewhat similar in the training data set and the testing data set.

The training module 520 may train the ML module 530 by extracting a feature set from a plurality of data records (e.g., labeled as yes) in the training data set 510 according to one or more feature selection techniques. The training module 520 may train the ML module 530 by extracting a feature set from the training data set 510 that includes statistically significant features of positive examples (e.g., labeled as being yes) and statistically significant features of negative examples (e.g., labeled as being no).

The training module 520 may extract a feature set from the training data set 510 in a variety of ways. The training module 520 may perform feature extraction multiple times, each time using a different feature-extraction technique. In an example, the feature sets generated using the different techniques may each be used to generate different machine learning-based classification models 540A-540N. For example, the feature set with the highest quality metrics may be selected for use in training. The training module 520 may use the feature set(s) to build one or more machine learning-based classification models 540A-540N that are configured to indicate whether a particular label applies to a new/unseen data record based on its corresponding one or more variables.

The training data set 510 may be analyzed to determine any dependencies, associations, and/or correlations between features and the yes/no labels in the training data set 510. The identified correlations may have the form of a list of features that are associated with different yes/no labels. The term "feature," as used herein, may refer to any characteristic of an item of data that may be used to determine whether the item of data falls within one or more specific categories. A feature selection technique may comprise one or more feature selection rules. The one or more feature selection rules may comprise a feature occurrence rule. The feature occurrence rule may comprise determining which features in the training data set 510 occur over a threshold number of times and identifying those features that satisfy the threshold as candidate features.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training data set 510 to generate a first list of features. A final list of candidate features may be analyzed according to additional feature selection techniques to determine one or more candidate feature groups (e.g., groups of features that may be used to predict whether a label applies or does not apply). Any suitable computational technique may be used to identify the candidate feature groups using any feature selection technique such as filter, wrapper, and/or embedded methods. One or more candidate feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable (e.g., yes/no).

As another example, one or more candidate feature groups may be selected according to a wrapper method. A wrapper method may be configured to use a subset of features and train a machine learning model using the subset of features. Based on the inferences that drawn from a previous model, features may be added and/or deleted from the subset. Wrapper methods include, for example, forward feature selection, backward feature elimination, recursive feature elimination, combinations thereof, and the like. As an example, forward feature selection may be used to identify one or more candidate feature groups. Forward feature selection is an iterative method that begins with no feature in the machine learning model. In each iteration, the feature which best improves the model is added until an addition of a new variable does not improve the performance of the machine learning model. As an example, backward elimination may be used to identify one or more candidate feature groups. Backward elimination is an iterative method that begins with all features in the machine learning model. In each iteration, the least significant feature is removed until no improvement is observed on removal of features. Recursive feature elimination may be used to identify one or more candidate feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 520 has generated a feature set(s), the training module 520 may generate one or more machine learning-based classification models 540A-540N based on the feature set(s). A machine learning-based classification model may refer to a complex mathematical model for data classification that is generated using machine-learning techniques. In one example, the machine learning-based classification model 740 may include a map of support vectors that represent boundary features. By way of example, boundary features may be selected from, and/or represent the highest-ranked features in, a feature set.

The training module 520 may use the feature sets extracted from the training data set 510 to build the one or more machine learning-based classification models 540A-540N for each classification category (e.g., yes, no). In some examples, the machine learning-based classification models 540A-540N may be combined into a single machine learning-based classification model 740. Similarly, the ML module 530 may represent a single classifier containing a single or a plurality of machine learning-based classification models 740 and/or multiple classifiers containing a single or a plurality of machine learning-based classification models 740.

The extracted features (e.g., one or more candidate features) may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting ML module 530 may comprise a decision rule or a mapping for each candidate feature.

In an embodiment, the training module 520 may train the machine learning-based classification models 740 as a convolutional neural network (CNN). The CNN may comprise at least one convolutional feature layer and three fully connected layers leading to a final classification layer (softmax). The final classification layer may finally be applied to combine the outputs of the fully connected layers using softmax functions as is known in the art.

The candidate feature(s) and the ML module 530 may be used to predict whether a label (e.g., attending an Ivy League college) applies to a data record in the testing data set. In one example, the result for each data record in the testing data set includes a confidence level that corresponds to a likelihood or a probability that the one or more corresponding variables (e.g., demographic attributes) are indicative of the label applying to the data record in the testing data set. The confidence level may be a value between zero and one, and it may represent a likelihood that the data record in the testing data set belongs to a yes/no status with regard to the one or more corresponding variables (e.g., demographic attributes). In one example, when there are two statuses (e.g., yes and no), the confidence level may correspond to a value p, which refers to a likelihood that a particular data record in the testing data set belongs to the first status (e.g., yes). In this case, the value 1-p may refer to a likelihood that the particular data record in the testing data set belongs to the second status (e.g., no). In general, multiple confidence levels may be provided for each data record in the testing data set and for each candidate feature when there are more than two labels. A top performing candidate feature may be determined by comparing the result obtained for each test data record with the known yes/no label for each data record. In general, the top performing candidate feature will have results that closely match the known yes/no labels. The top performing candidate feature(s) may be used to predict the yes/no label of a data record with regard to one or more corresponding variables. For example, a new data record may be determined/received. The new data record may be provided to the ML module 530 which may, based on the top performing candidate feature, classify the label as either applying to the new data record or as not applying to the new data record.

Figure 6:
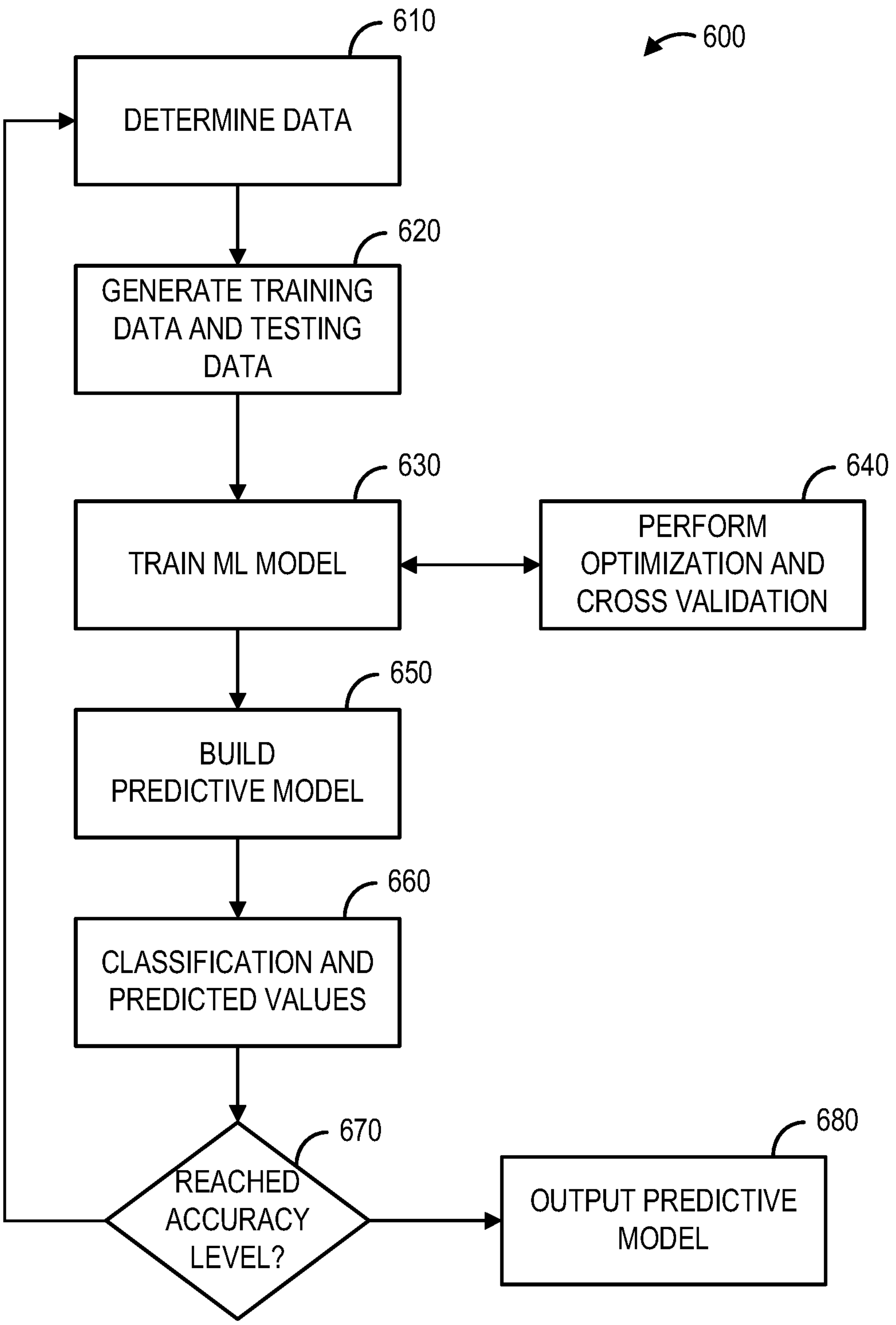
FIG. 6 shows an example method.

6 Turning now to FIG. 6, a flowchart illustrating an example training method 600 for generating the ML module 530 using the training module 520 is shown. The training module 520 can implement supervised, unsupervised, and/or semi-supervised (e.g., reinforcement based) machine learning-based classification models 540A-740N. The training module 520 may comprise the data processing module 106A and/or the predictive module 106B. The method 600 illustrated in FIG. 6 is an example of a supervised learning method; variations of this example of training method are discussed below, however, other training methods can be analogously implemented to train unsupervised and/or semi-supervised machine learning models.

The training method 600 may determine (e.g., access, receive, retrieve, etc.) first data records that have been processed by the data processing module 106A at step 610. The first data records may comprise a labeled set of data records, such as the data records 104. The labels may correspond to a label (e.g., yes or no) and one or more corresponding variables, such one or more of the variables 105. The training method 600 may generate, at step 620, a training data set and a testing data set. The training data set and the testing data set may be generated by randomly assigning labeled data records to either the training data set or the testing data set. In some implementations, the assignment of labeled data records as training or testing samples may not be completely random. As an example, a majority of the labeled data records may be used to generate the training data set. For example, 55% of the labeled data records may be used to generate the training data set and 25% may be used to generate the testing data set.

The training method 600 may train one or more machine learning models at step 630. In one example, the machine learning models may be trained using supervised learning. In another example, other machine learning techniques may be employed, including unsupervised learning and semi-supervised. The machine learning models trained at 630 may be selected based on different criteria depending on the problem to be solved and/or data available in the training data set. For example, machine learning classifiers can suffer from different degrees of bias. Accordingly, more than one machine learning model can be trained at 630, optimized, improved, and cross-validated at step 640.

For example, a loss function may be used when training the machine learning models at step 630. The loss function may take true labels and predicted outputs as its inputs, and the loss function may produce a single number output. One or more minimization techniques may be applied to some or all learnable parameters of the machine learning model (e.g., one or more learnable neural network parameters) in order to minimize the loss. For example, the one or more minimization techniques may not be applied to one or more learnable parameters, such as encoder modules that have been trained, a neural network block(s), a neural network layer(s), etc. This process may be continuously applied until some stopping condition is met, such as a certain number of repeats of the full training dataset and/or a level of loss for a left-out validation set has ceased to decrease for some number of iterations. In addition to adjusting these learnable parameters, one or more of the hyperparameters 505 that define the model architecture 503 of the machine learning models may be selected. The one or more hyperparameters 505 may comprise a number of neural network layers, a number of neural network filters in a neural network layer, etc. For example, as discussed above, each set of the hyperparameters 505 may be used to build the model architecture 503, and an element of each set of the hyperparameters 505 may comprise a number of inputs (e.g., data record attributes/variables) to include in the model architecture 503. The element of each set of the hyperparameters 505 comprising the number of inputs may be considered the "plurality of features" as described herein with respect to the method 200. That is, the cross-validation and optimization performed at step 640 may be considered as a feature selection step. For example, continuing with the above example regarding grade records and demographic attributes, an element of a first set of the hyperparameters 505 may comprise all grade records (e.g., data record attributes) associated with a data record for a particular student (e.g., all class years) and/or all demographic attributes (e.g., variable attributes) associated with that particular student. An element of a second set of the hyperparameters 505 may comprise grade records (e.g., data record attributes) for only one class year for a particular student and/or a demographic attribute (e.g., variable attribute) associated with that particular student. In order to select the best hyperparameters 505, at step 640 the machine learning models may be optimized by training the same using some portion of the training data (e.g., based on the element of each set of the hyperparameters 505 comprising the number of inputs for the model architecture 503). The optimization may be stopped based on a left-out validation portion of the training data. A remainder of the training data may be used to cross-validate. This process may be repeated a certain number of times, and the machine learning models may be evaluated for a particular level of performance each time and for each set of hyperparameters 505 that are selected (e.g., based on the number of inputs and the particular inputs chosen).

A best set of the hyperparameters 505 may be selected by choosing one or more of the hyperparameters 505 having a best mean evaluation of the "splits" of the training data. A cross-validation object may be used to provide a function that will create a new, randomly-initialized iteration of the method 200 described herein. This function may be called for each new data split, and each new set of hyperparameters 505. A cross-validation routine may determine a type of data that is within the input (e.g., attribute type(s)), and a chosen amount of data (e.g., a number of attributes) may be split-off to use as a validation dataset. A type of data splitting may be chosen to partition the data a chosen number of times. For each data partition, a set of the hyperparameters 505 may be used, and a new machine learning model comprising a new model architecture 503 based on the set of the hyperparameters 505 may be initialized and trained. After each training iteration, the machine learning model may be evaluated on the test portion of the data for that particular split. The evaluation may return a single number, which may depend on the machine learning model's output and the true output label. The evaluation for each split and hyperparameter set may be stored in a table, which may be used to select the optimal set of the hyperparameters 505. The optimal set of the hyperparameters 505 may comprise one or more of the hyperparameters 505 having a highest average evaluation score across all splits.

The training method 600 may select one or more machine learning models to build a predictive model at 650. The predictive model may be evaluated using the testing data set. The predictive model may analyze the testing data set and generate one or more of a prediction or a score at step 660. The one or more predictions and/or scores may be evaluated at step 670 to determine whether they have achieved a desired accuracy level. Performance of the predictive model may be evaluated in a number of ways based on a number of true positives, false positives, true negatives, and/or false negatives classifications of the plurality of data points indicated by the predictive model.

For example, the false positives of the predictive model may refer to a number of times the predictive model incorrectly classified a label as applying to a given data record when in reality the label did not apply. Conversely, the false negatives of the predictive model may refer to a number of times the machine learning model indicated a label as not applying when, in fact, the label did apply. True negatives and true positives may refer to a number of times the predictive model correctly classified one or more labels as applying or not applying. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends and the predictive model (e.g., the ML module 530) may be output at step 680; when the desired accuracy level is not reached, however, then a subsequent iteration of the training method 600 may be performed starting at step 610 with variations such as, for example, considering a larger collection of data records.

Figure 7:
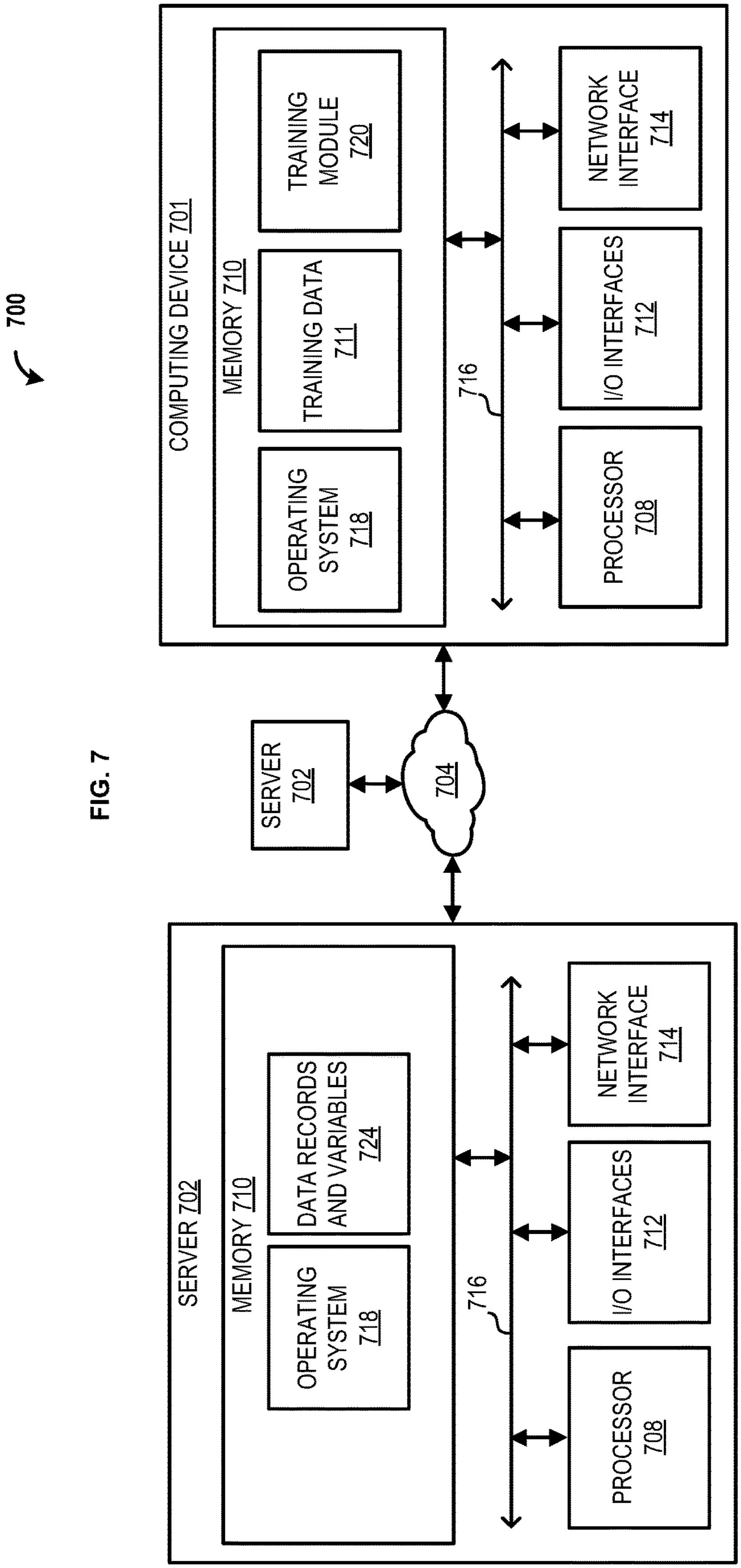
FIG. 7 shows an example system.

FIG. 7 is a block diagram depicting an environment 700 comprising non-limiting examples of a computing device 701 (e.g., the computing device 106) and a server 702 connected through a network 704. In an aspect, some or all steps of any described method herein may be performed by the computing device 701 and/or the server 702. The computing device 701 can comprise one or multiple computers configured to store one or more of the data records 104, training data 510 (e.g., labeled data records), the data processing module 106A, the predictive module 106B, and the like. The server 702 can comprise one or multiple computers configured to store the data records 104. Multiple servers 702 can communicate with the computing device 701 via the through the network 704. In an embodiment, the computing device 701 may comprise a repository for training data 711 generated by the methods described herein.

The computing device 701 and the server 702 can be a digital computer that, in terms of hardware architecture, generally includes a processor 708, memory system 710, input/output (I/O) interfaces 712, and network interfaces 714. These components (908, 710, 712, and 714) are communicatively coupled via a local interface 716. The local interface 716 can be, for example, but not limited to, one or more buses or other wired or wireless connections, as is known in the art. The local interface 716 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 708 can be a hardware device for executing software, particularly that stored in memory system 710. The processor 708 can be any custom made or commercially available processor, a central processing unit (CPU), an auxiliary processor among several processors associated with the computing device 701 and the server 702, a semiconductor-based microprocessor (in the form of a microchip or chip set), or generally any device for executing software instructions. When the computing device 701 and/or the server 702 is in operation, the processor 708 can be configured to execute software stored within the memory system 710, to communicate data to and from the memory system 710, and to generally control operations of the computing device 701 and the server 702 pursuant to the software.

The I/O interfaces 712 can be used to receive user input from, and/or for providing system output to, one or more devices or components. User input can be provided via, for example, a keyboard and/or a mouse. System output can be provided via a display device and a printer (not shown). I/O interfaces 792 can include, for example, a serial port, a parallel port, a Small Computer System Interface (SCSI), an infrared (IR) interface, a radio frequency (RF) interface, and/or a universal serial bus (USB) interface.

The network interface 714 can be used to transmit and receive from the computing device 701 and/or the server 702 on the network 704. The network interface 714 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 714 may include address, control, and/or data connections to enable appropriate communications on the network 704.

The memory system 710 can include any one or combination of volatile memory elements (e.g., random access memory (RAM, such as DRAM, SRAM, SDRAM, etc.) and nonvolatile memory elements (e.g., ROM, hard drive, tape, CDROM, DVDROM, etc.). Moreover, the memory system 710 may incorporate electronic, magnetic, optical, and/or other types of storage media. Note that the memory system 710 can have a distributed architecture, where various components are situated remote from one another, but can be accessed by the processor 708.

The software in memory system 710 may include one or more software programs, each of which comprises an ordered listing of executable instructions for implementing logical functions. In the example of FIG. 7, the software in the memory 710 of the computing device 701 can comprise the training data 711, a training module 720 (e.g., the predictive module 106B), and a suitable operating system (O/S) 718. In the example of FIG. 7, the software in the memory system 710 of the server 702 can comprise data records and variables 724 (e.g., the data records 104 and the variables 105), and a suitable operating system (O/S) 718. The operating system 718 essentially controls the execution of other computer programs and provides scheduling, input-output control, file and data management, memory management, and communication control and related services.

For purposes of illustration, application programs and other executable program components such as the operating system 718 are illustrated herein as discrete blocks, although it is recognized that such programs and components can reside at various times in different storage components of the computing device 701 and/or the server 702. An implementation of the training module 520 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 8:
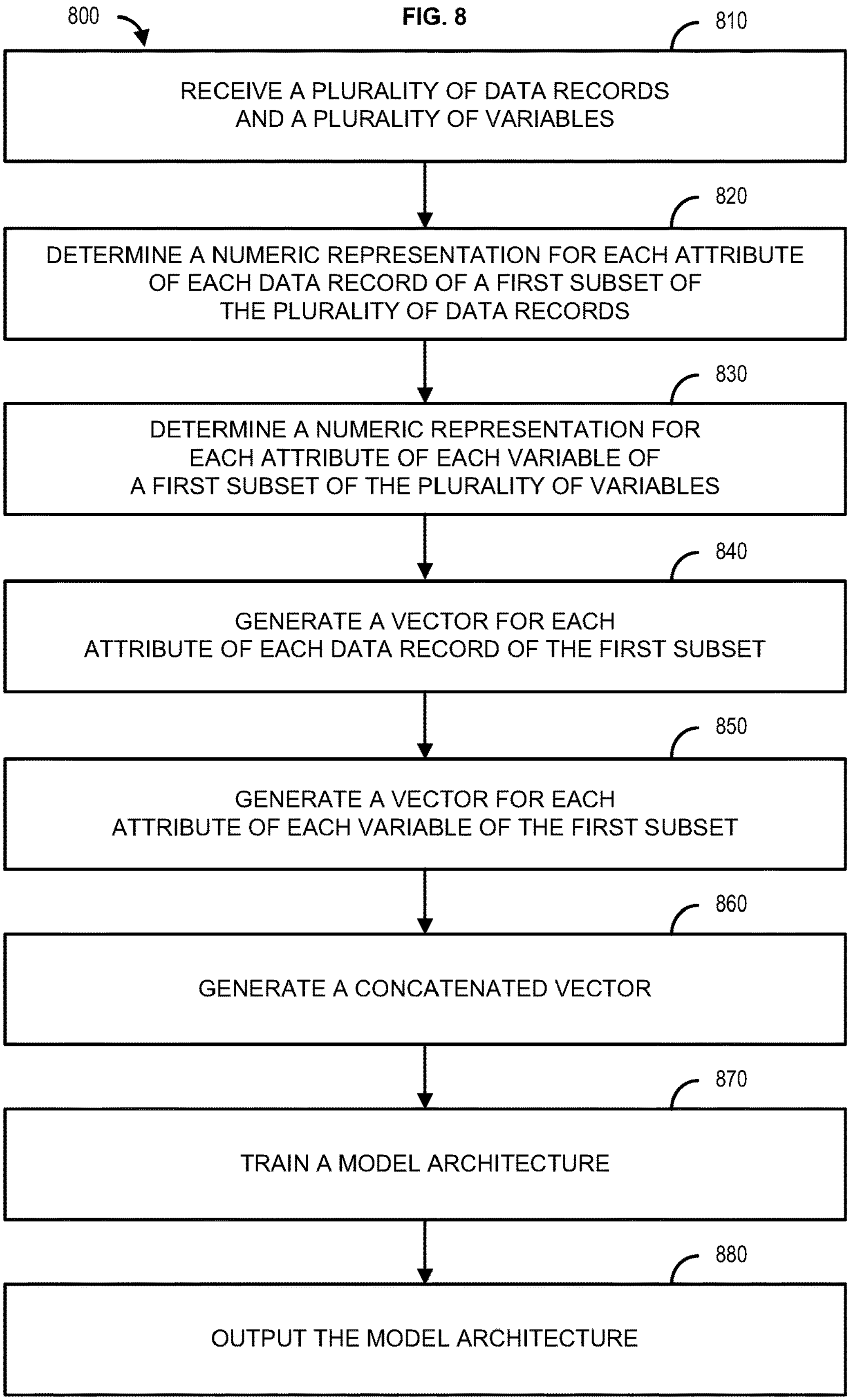
FIG. 8 shows an example method.

Turning now to FIG. 8, a flowchart of an example method 800 for generating, training, and outputting improved deep-learning models is shown. Unlike existing deep-learning models and frameworks, which are designed to be problem/analysis specific, the framework implemented by the method 800 may be applicable for a wide range of predictive and/or generative data analysis. The method 800 may be performed in whole or in part by a single computing device, a plurality of computing devices, and the like. For example, the computing device 106, the training module 520, the server 702, and/or the computing device 704 may be configured to perform the method 800.

At step 810, a computing device may receive a plurality of data records and a plurality of variables. Each of the plurality of data records and each of the plurality of variables may each comprise one or more attributes. Each data record of the plurality of data records may be associated with one or more variables of the plurality of variables. The computing device may determine a plurality of features for a model architecture to train a predictive model as described herein. The computing device may determine the plurality of features, for example, based on a set of hyperparameters (e.g., a set of the hyperparameters 505). The set of hyperparameters may comprise a number of neural network layers/blocks, a number of neural network filters in a neural network layer, etc. An element of the set of hyperparameters may comprise a first subset of the plurality of data records (e.g., data record attributes/variables) to include in the model architecture and for training a predictive model as described herein. For example, continuing with the examples described herein regarding grade records and demographic attributes, the element of the set of hyperparameters may comprise all grade records (e.g., data record attributes) associated with a data record for a particular student (e.g., all class years). Other examples for the first subset of the plurality of data records are possible. Another element of the set of hyperparameters may comprise a first subset of the plurality of variables (e.g., attributes) to include in the model architecture and for training the predictive model. For example, the first subset of the plurality of variables may comprise one or more demographic attributes described herein (e.g., age, state, etc.). Other examples for the first subset of the plurality of data variables are possible. At step 820, the computing device may determine a numeric representation for each attribute associated with each data record of the first subset of the plurality of data records. Each attribute associated with each data record of the first subset of the plurality of data records may be associated with a label, such as a binary label (e.g., yes/no) and/or a percentage value. At step 830, the computing device may determine a numeric representation for each attribute associated with each variable of the first subset of the plurality of variables. Each attribute associated with each variable of the first subset of the plurality of variables may be associated with the label (e.g., the binary label and/or the percentage value).

The computing device may use a plurality of processors and/or tokenizers when determining the numeric representation for each attribute associated with each variable of the first subset of the plurality of variables that is not of a numeric form (e.g., strings, etc.). For example, determining the numeric representation for each attribute associated with each variable of the first subset of the plurality of variables may comprise determining, by the plurality of processors and/or tokenizers, for each attribute associated with each variable of the first subset of the plurality of variables, a token. Each respective token may be used to determine the numeric representation for each attribute associated with each variable of the first subset of the plurality of variables. One or more attributes associated with one or more variables of the first subset of the plurality of variables may comprise at least a non-numeric portion, and each token may comprise the numeric representation for at least the non-numeric portion. Thus, in some examples, the numeric representation for at least the non-numeric portion of a respective attribute associated with a respective variable may be used to determine the numeric representation for that attribute.

At step 840, the computing device may generate a vector for each attribute of each data record of the first subset of the plurality of data records. For example, a first plurality of encoder modules may generate a vector for each attribute of each data record of the first subset of the plurality of data records. The first plurality of encoder modules may generate the vector for each attribute of each data record of the first subset of the plurality of data records based on the numeric representation for each data record of the first subset of the plurality of data records.

At step 850, the computing device may generate a vector for each attribute of each variable of the first subset of the plurality of variables. For example, a second plurality of encoder modules may generate a vector for each attribute of each variable of the first subset of the plurality of variables.

The second plurality of encoder modules may generate the vector for each attribute of each variable of the first subset of the plurality of variable based on the numeric representation for each variable of the first subset of the plurality of variables.

At step 860, the computing device may generate a concatenated vector. For example, the computing device may generate the concatenated vector based on the vector for each attribute of each data record of the first subset of the plurality of data records. As another example, the computing device may generate the concatenated vector based on the vector for each attribute of each variable of the first subset of the plurality of variables. The concatenated vector may be indicative of the label. For example, the concatenated vector may be indicative of the label associated with each attribute of each data record of the first subset of the plurality of data records (e.g., the binary label and/or the percentage value). As another example, the concatenated vector may be indicative of the label for each variable of the first subset of the plurality of variables (e.g., the binary label and/or the percentage value). As discussed above, the plurality of features (e.g., based on the set of hyperparameters) may comprise as few as one or as many as all corresponding attributes of the data records of the first subset of the plurality of data records and the variables of the first subset of the plurality of variables. The concatenated vector may therefore be based on as few as one or as many as all corresponding attributes of the data records of the first subset of the plurality of data records and the variables of the first subset of the plurality of variables.

At step 870, the computing device may train the model architecture based on the concatenated vector. For example, the computing device may train the predictive model, the first plurality of encoder modules, and/or the second plurality of encoder modules based on the concatenated vector. At step 880, the computing device may output (e.g., save) the model architecture as a trained predictive model, a trained first plurality of encoder modules, and/or a trained second plurality of encoder modules. The trained first plurality of encoder modules may comprise a first plurality of neural network blocks, and the trained second plurality of encoder modules may comprise a second plurality of neural network blocks. The trained first plurality of encoder modules may comprise one or more parameters (e.g., hyperparameters) for the first plurality of neural network blocks based on each attribute of each data record of the first subset of the plurality of data records (e.g., based on attributes of each data record). The trained second plurality of encoder modules may comprise one or more parameters (e.g., hyperparameters) for the second plurality of neural network blocks based on each variable of the first subset of the plurality of variables (e.g., based on attributes of each variable). The computing device may optimize the predictive model based on a second subset of the plurality of data records, a second subset of the plurality of variables, and/or a cross-validation technique using a set of hyperparameters as described herein with respect to step 650 of the method 600.

Figure 9:
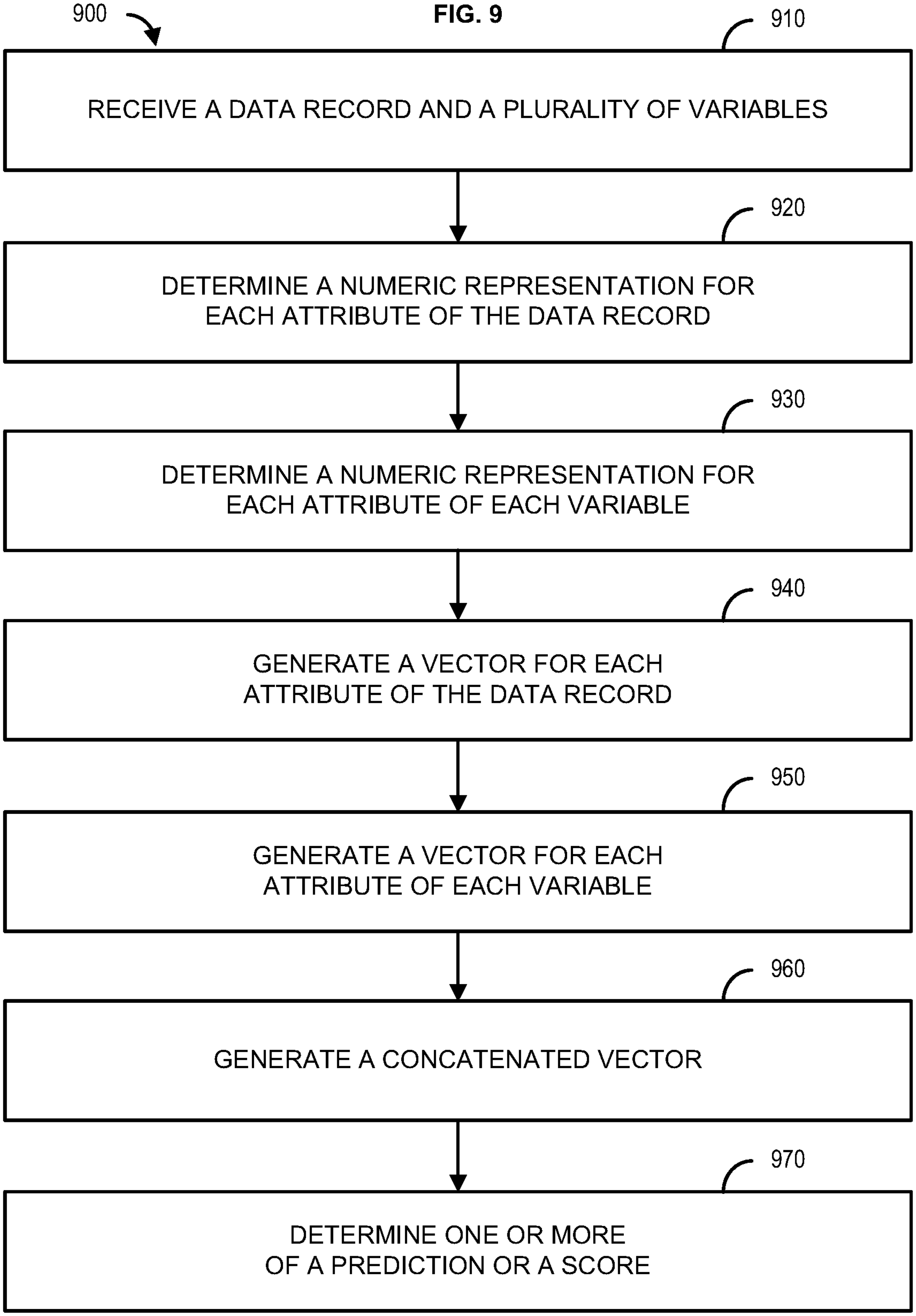
FIG. 9 shows an example method.

Turning now to FIG. 9, a flowchart of an example method 900 for using deep-learning models is shown. Unlike existing deep-learning models and frameworks, which are designed to be problem/analysis specific, the framework implemented by the method 900 may be applicable for a wide range of predictive and/or generative data analysis. The method 900 may be performed in whole or in part by a single computing device, a plurality of computing devices, and the like. For example, the computing device 106, the training module 520, the server 702, and/or the computing device 704 may be configured to perform the method 900.

A model architecture comprising a trained predictive model, a first plurality of encoder modules, and/or a second plurality of encoder modules may be used by a computing device to provide one or more of a score or a prediction associated with a previously unseen data record(s) and a previously unseen plurality of variables. The model architecture may have been previously trained based on a plurality of features, such as a set of hyperparameters (e.g., a set of the hyperparameters 505). The set of hyperparameters may comprise a number of neural network layers/blocks, a number of neural network filters in a neural network layer, etc. For example, continuing with the examples described herein regarding grade records and demographic attributes, an element of the set of hyperparameters may comprise all grade records (e.g., data record attributes) associated with a data record for a particular student (e.g., all class years). Other examples are possible. Another element of the set of hyperparameters may comprise one or more demographic attributes described herein (e.g., age, state, etc.). Other examples are possible.

At step 910, the computing device may receive a data record and the plurality of variables. The data record and each of the plurality of variables may each comprise one or more attributes. The data record may be associated with one or more variables of the plurality of variables. At step 920, the computing device may determine a numeric representation for one or more attributes associated with the data record. For example, the computing device may determine the numeric representation for each of the one or more attributes associated with the data record in a similar manner as described herein with respect to step 206 of the method 200. At step 930, the computing device may determine a numeric representation for each of one or more attributes associated with each variable of the plurality of variables. For example, the computing device may determine the numeric representation for each of the one or more attributes associated with each of the plurality of variables in a similar manner as described herein with respect to step 206 of the method 200. The computing device may use a plurality of processors and/or tokenizers when determining the numeric representation for each of the one or more attributes associated with each variable of the plurality of variables. For example, determining the numeric representation for each of the one or more attributes associated with each variable of plurality of variables may comprise determining, by the plurality of processors and/or tokenizers, for each of the one or more attributes associated with each variable of the plurality of variables, a token. Each respective token may be used to determine the numeric representation for each of the one or more attributes associated with each variable of the plurality of variables. Each of the one or more attributes associated with each variable of the plurality of variables may comprise at least a non-numeric portion, and each may token comprise the numeric representation for the at least the non-numeric portion. Thus, in some examples, the numeric representation for the at least the non-numeric portion of a respective attribute associated with a respective variable may be used to determine the numeric representation for that attribute.

At step 940, the computing device may generate a vector for each of the one or more attributes associated with the data record. For example, the computing device may use a first plurality of trained encoder modules to determine the vector for each of the one or more attributes associated with the data record. The computing device may use the first plurality of trained encoder modules to determine the vector for each of the one or more attributes associated with the data record based on the numeric representation for each of the one or more attributes associated with the data record. At step 950, the computing device may generate a vector for each of the one or more attributes associated with each of the plurality of variables. For example, the computing device may use a second plurality of trained encoder modules to determine a vector for each attribute of each variable of the plurality of variables. The computing device may use the second plurality of trained encoder modules to determine the vector for each attribute of each variable of the first plurality of variables based on the numeric representation for each of the one or more attributes associated with each variable of the plurality of variables. The first plurality of trained encoder modules may comprise a first plurality of neural network blocks, and the second plurality of trained encoder modules may comprise a second plurality of neural network blocks. The first plurality of trained encoder modules may comprise one or more parameters for the first plurality of neural network blocks based on each attribute of each data record of the plurality of data records (e.g., based on attributes of each data record). The second plurality of trained encoder modules may comprise one or more parameters for the second plurality of neural network blocks based on each variable of the plurality of variables (e.g., based on attributes of each variable).

At step 960, the computing device may generate a concatenated vector. For example, the computing device may generate the concatenated vector based on the vector for each of the one or more attributes associated with the data record and the vector for each attribute of each variable of the plurality of variables. At step 970, the computing device may determine one or more of a prediction or a score associated with the data record and the plurality of variables. For example, the computing device may use a trained predictive model of the model architecture to determine one or more of the prediction or the score associated with the data record and the plurality of variables. The trained predictive model may comprise the model architecture described above in the method 800. The trained predictive model may determine one or more of the prediction or the score associated with the data record and the plurality of variables based on the concatenated vector. The score may be indicative of a likelihood that a first label applies to the data record and/or the plurality of variables. For example, the first label may comprise a binary label (e.g., yes/no) and/or a percentage value.

Figure 10:
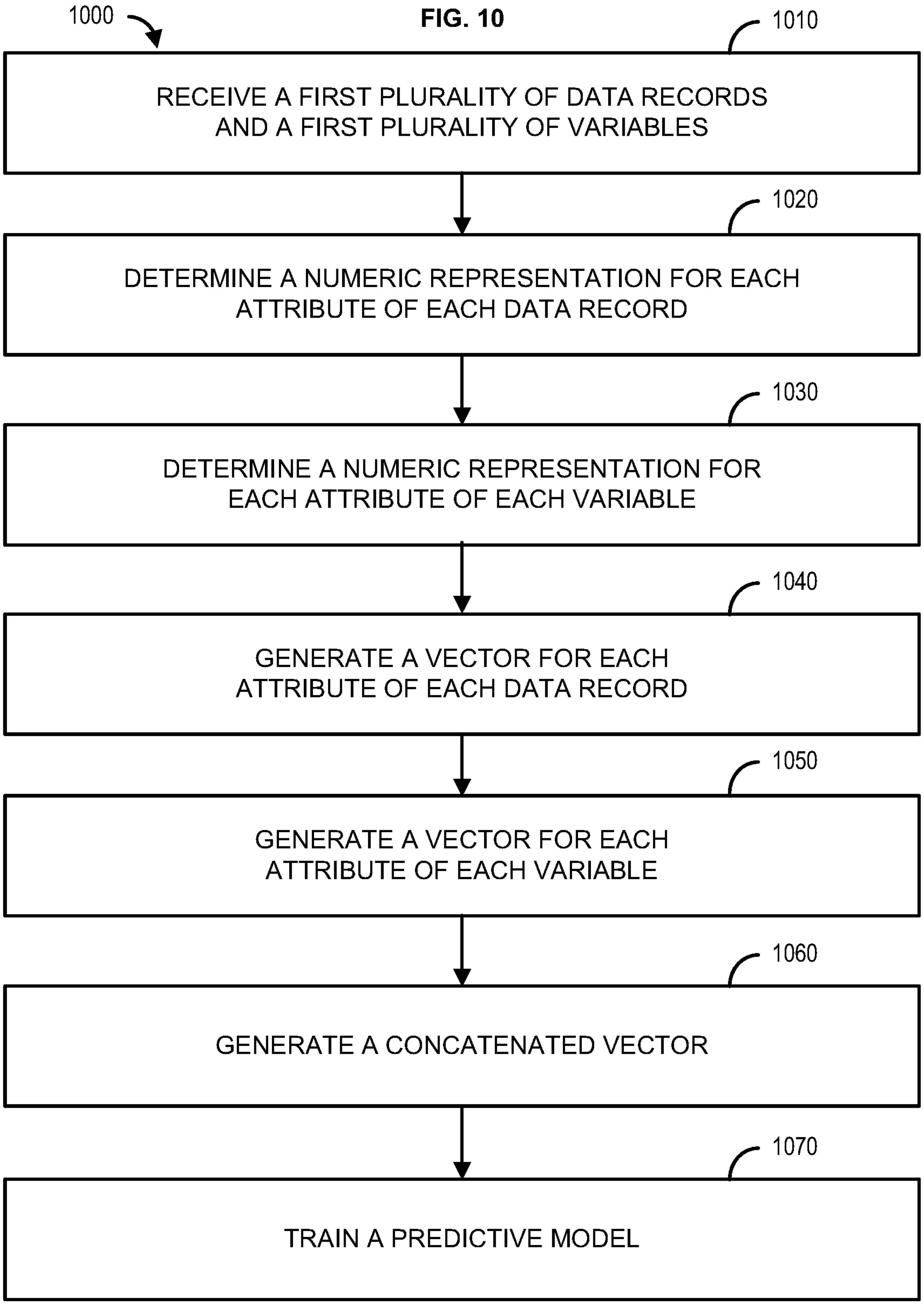
FIG. 10 shows an example method.

Turning now to FIG. 10, a flowchart of an example method 1000 for retraining a model architecture comprising a trained predictive model (e.g., a trained deep-learning model) is shown. Unlike existing deep-learning models and frameworks, which are designed to be problem/analysis specific, the framework implemented by the method 1000 may be applicable for a wide range of predictive and/or generative data analysis. The method 1000 may be performed in whole or in part by a single computing device, a plurality of computing devices, and the like. For example, the computing device 106, the training module 520, the server 702, and/or the computing device 704 may be configured to perform the method 1000.

As described herein, a model architectures comprising trained predictive models and trained encoder modules may be capable of providing a range of predictive and/or generative data analysis. The model architecture comprising the trained predictive models and the trained encoder modules may be have been initially trained to provide a first set of predictive and/or generative data analysis, and each may be retrained according to the method 1000 in order to provide another set of predictive and/or generative data analysis. For example, the model architecture may have been previously trained based on a plurality of features, such as a set of hyperparameters (e.g., a set of the hyperparameters 505). The set of hyperparameters may comprise a number of neural network layers/blocks, a number of neural network filters in a neural network layer, etc. For example, continuing with the examples described herein regarding grade records and demographic attributes, an element of the set of hyperparameters may comprise all grade records (e.g., data record attributes) associated with a data record for a particular student (e.g., all class years). Other examples are possible. Another element of the set of hyperparameters may comprise one or more demographic attributes described herein (e.g., age, state, etc.). Other examples are possible. The model architecture may be retrain according to another set of hyperparameters and/or another element(s) of a set of hyperparameters.

At step 1010, a computing device may receive a first plurality of data records and a first plurality of variables. The first plurality of data records and the first plurality of variables may each comprise one or more attributes and be associated with a label. At step 1020, the computing device may determine a numeric representation for each attribute of each data record of the first plurality of data records. At step 1030, the computing device may determine a numeric representation for each attribute of each variable of the first plurality of variables. At step 1040, the computing device may generate a vector for each attribute of each data record of the first plurality of data records. For example, the computing device may use a first plurality of trained encoder modules to generate the vector for each attribute of each data record of the first plurality of data records. Each of the vectors for each attribute of each data record of the first plurality of data records may be based on the corresponding numeric representation for each attribute of each data record of the first plurality of data records. The first plurality of trained encoder modules may have been previously trained based on a plurality of training data records associated with the label and a first set of hyperparameters. The first plurality of trained encoder modules may comprise a first plurality of parameters (e.g., hyperparameters) for a plurality of neural network blocks based on each attribute of each data record of the plurality of training data records. The first plurality of data records may be associated with a second set of hyperparameters that differ at least partially from the first set of hyperparameters. For example, the first set of hyperparameters may be grade records for a first year of classes, and the second set of hyperparameters may be grade records for a second year of the classes.

At step 1050, the computing device may generate a vector for each attribute of each variable of the first plurality of variables. For example, the computing device may use a second plurality of trained encoder modules to generate the vector for each attribute of each variable of the first plurality of variables. Each of the vectors for each attribute of each variable of the first plurality of variables may be based on the corresponding numeric representation for each attribute of each variable of the first plurality of variables. The second plurality of trained encoder modules may have been previously trained based on a plurality of training data records associated with the label and the first set of hyperparameters. The first plurality of variables may be associated with the second set of hyperparameters.

At step 1060, the computing device may generate a concatenated vector. For example, the computing device may generate the concatenated vector based on the vector for each attribute of each data record of the first plurality of data records. As another example, the computing device may generate the concatenated vector based on the vector for each attribute of each variable of the first plurality of variables. At step 106A0, the computing device may retrain the model architecture. For example, the computing device may retrain the model architecture based on the concatenated vector, which may have been generated at step 1060 based on another set of hyperparameters and/or another element(s) of a set of hyperparameters. The computing device may also retrain the first plurality of encoder modules and/or the second plurality of encoder modules based on the concatenated vector (e.g., based on the other set of hyperparameters and/or other element(s) of a set of hyperparameters). The first plurality of encoder modules, once retrained, may comprise a second plurality of parameters (e.g., hyperparameters) for the plurality of neural network blocks based on each attribute of each data record of the first plurality of data records. The second plurality of encoder modules, once retrained, may comprise a second plurality of parameters (e.g., hyperparameters) for the plurality of neural network blocks based on each attribute of each data record of the first plurality of variables. Once retrained, the model architecture may provide another set of predictive and/or generative data analysis. The computing device may output (e.g., save) the retrained model architecture.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:

receiving, at a computing device, a plurality of data records and a plurality of variables;

determining, for each attribute of each data record of a first subset of the plurality of data records, a first numeric representation, wherein each data record of the first subset of the plurality of data records is associated with a label;

determining, for each attribute of each variable of a first subset of the plurality of variables, a second numeric representation, wherein each variable of the first subset of the plurality of variables is associated with the label;

generating, by a first plurality of encoder modules, and based on the first numeric representation for each attribute of each data record of the first subset of the plurality of data records, a vector for each attribute of each data record of the first subset of the plurality of data records;

generating, by a second plurality of encoder modules, and based on the second numeric representation for each attribute of each variable of the first subset of the plurality of variables, a vector for each attribute of each variable of the first subset of the plurality of variables;

generating, based on the vector for each attribute of each data record of the first subset of the plurality of data records, and based on the vector for each attribute of each variable of the first subset of the plurality of variables, a concatenated vector, wherein the concatenated vector includes a concatenated fingerprint including a fingerprint of the each data record and a fingerprint of the each variable;

training, based on the concatenated vector, a model architecture comprising a predictive model, the first plurality of encoder modules, and the second plurality of encoder modules, wherein the training includes:

applying a cross-validation technique that partitions the training data into a plurality of splits, for each split of the plurality of splits, training a model on the split of the training data using a respective set of hyperparameters and storing an evaluation of the respective set of hyperparameters, wherein the hyperparameters include a number of neural network blocks or a number of neural network filters in a neural network layer, selecting one set of hyperparameters based on the respective stored evaluation, and training the model architecture using the selected one set of hyperparameters; and outputting the model architecture.

2. The method of claim 1, wherein each attribute of each of the plurality of data records comprises an input sequence.

3. The method of claim 1, wherein each data record of the plurality of data records is associated with one or more variables of the plurality of variables.

4. The method of claim 1, wherein:

the model architecture is trained according to a first set of hyperparameters associated with one or more attributes of the plurality of data records and one or more attributes of the plurality of variables, the selected one set of hyperparameters has a highest evaluation score across the plurality of splits, and each data record of the plurality of data records includes one or more strings of data.

5. The method of claim 4, further comprising:

optimizing the model architecture based on a second set of hyperparameters and the cross-validation technique.

6. The method of claim 1, wherein determining, for each attribute of each variable of the first subset of the plurality of variables, the second numeric representation comprises:

determining, by a plurality of tokenizers, for at least one attribute of at least one variable of the first subset of the plurality of variables, a token.

7. The method of claim 6, wherein the at least one attribute of the at least one variable comprises at least a non-numeric portion, and wherein the token comprises the second numeric representation for the at least one attribute of the at least one variable.

8. A method comprising:

receiving, at a computing device, a data record and a plurality of variables;

determining, for each attribute of the data record, a first numeric representation;

determining, for each attribute of each variable of the plurality of variables, a second numeric representation;

generating, by a first plurality of trained encoder modules, and based on the first numeric representation for each attribute of the data record, a vector for each attribute of the data record;

generating, by a second plurality of trained encoder modules, and based on the second numeric representation for each attribute of each variable of the plurality of variables, a vector for each attribute of each variable of the plurality of variables;

generating, based on the vector for each attribute of the data record, and based on the vector for each attribute of each variable of the plurality of variables, a concatenated vector, wherein the concatenated vector includes a concatenated fingerprint including a fingerprint of the data record and a fingerprint of the variable; and determining, by a trained predictive model, based on the concatenated vector, one or more of a prediction or a score associated with the data record, wherein the trained predictive model is trained by:

applying a cross-validation technique that partitions training data into a plurality of splits, for each split of the plurality of splits, training a model on the split of the training data using a respective set of hyperparameters and storing an evaluation of the respective set of hyperparameters, wherein the selected one set of hyperparameters has a highest evaluation score across the plurality of splits, selecting one set of hyperparameters based on the respective stored evaluation, and training using the selected one set of hyperparameters.

9. The method of claim 8, wherein;

the prediction comprises a binary label, the hyperparameters include a number of neural network blocks or a number of neural network filters in a neural network layer, and each data record of the plurality of data records includes one or more strings of data.

10. The method of claim 8, wherein the score is indicative of a likelihood that a first label applies to the data record.

11. The method of claim 8, wherein the first plurality of trained encoder modules comprises a plurality of neural network blocks.

12. The method of claim 8, wherein the second plurality of trained encoder modules comprises a plurality of neural network blocks.

13. The method of claim 8, wherein determining, for each attribute of each variable of the plurality of variables, the second numeric representation comprises:

determining, by a plurality of tokenizers, for at least one attribute of at least one variable of the plurality of variables, a token.

14. The method of claim 13, wherein the at least one attribute of the at least one variable comprises at least a non-numeric portion, and wherein the token comprises the second numeric representation for the at least one attribute of the at least one variable.

15. A method comprising:

receiving, at a computing device, a first plurality of data records and a first plurality of variables associated with a label;

determining, for each attribute of each data record of the first plurality of data records, a first numeric representation;

determining, for each attribute of each variable of the first plurality of variables, a second numeric representation;

generating, by a first plurality of trained encoder modules, and based on the first numeric representation for each attribute of each data record of the first plurality of data records, a vector for each attribute of each data record of the first plurality of data records;

generating, by a second plurality of trained encoder modules, and based on the second numeric representation for each attribute of each variable of the first plurality of variables, a vector for each attribute of each variable of the first plurality of variables;

generating, based on the vector for each attribute of each data record of the first plurality of data records, and based on the vector for each attribute of each variable of the first plurality of variables, a concatenated vector, wherein the concatenated vector includes a concatenated fingerprint including a fingerprint of the each data record and a fingerprint of the each variable; and retraining, based on the concatenated vector, a trained predictive model, the first plurality of encoder modules, and the second plurality of encoder modules, wherein the retraining includes:

applying a cross-validation technique that partitions the first plurality of data records into a plurality of splits, for each split of the plurality of splits, retraining a model on the split using a respective set of hyperparameters and storing an evaluation of the respective set of hyperparameters, wherein sets of hyperparameters have different evaluation scores across the plurality of splits, selecting one set of hyperparameters based on the respective stored evaluation, and retraining the trained predictive model, the first plurality of encoder modules, and the second plurality of encoder modules using the selected one set of hyperparameters.

16. The method of claim 15, further comprising:

outputting the retrained predictive model.

17. The method of claim 15, wherein the first plurality of trained encoder modules are trained based on a plurality of training data records associated with the label and a first set of hyperparameters, wherein the first plurality of data records are associated with a second set of hyperparameters that differ at least partially from the first set of hyperparameters.

18. The method of claim 17, wherein:

the second plurality of trained encoder modules are trained based on a plurality of training variables associated with the label and the first set of hyperparameters, wherein the first plurality of variables are associated with the second set of hyperparameters, the selected one set of hyperparameters has a highest evaluation score across the plurality of splits, and each data record of the plurality of data records includes one or more strings of data.

19. The method of claim 17, wherein retraining the first plurality of encoder modules comprises:

retraining, based on the second set of hyperparameters, the first plurality of encoder modules.

20. The method of claim 17, wherein retraining the second plurality of encoder modules comprises:

retraining, based on the second set of hyperparameters, the second plurality of encoder modules.

* * * * *